(12) United States Patent
Ferlitsch et al.

(10) Patent No.: US 7,719,708 B2
(45) Date of Patent: May 18, 2010

(54) SECURED RELEASE METHOD AND SYSTEM FOR TRANSMITTING AND IMAGING A PRINT JOB IN WHICH A SECURITY ATTRIBUTE IN THE PRINT JOB HEADER WILL PREVENT ACCEPTANCE OF SUBSEQUENT DATA PACKETS UNTIL A USER PERFORMS AUTHENTICATION ON THE IMAGING DEVICE

(75) Inventors: Andrew Rodney Ferlitsch, Tigard, OR (US); Roy K. Chrisop, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1161 days.

(21) Appl. No.: 11/143,804

(22) Filed: Jun. 1, 2005

(65) Prior Publication Data

US 2006/0274355 A1 Dec. 7, 2006

(51) Int. Cl.
*G06K 15/00* (2006.01)
*G06F 15/00* (2006.01)

(52) U.S. Cl. ............... 358/1.15; 358/1.14; 358/468; 713/181; 710/31; 710/44; 710/46

(58) Field of Classification Search ............. 358/1.9, 358/468, 438–441, 1.11–1.18; 709/217, 709/224, 227–232, 240; 382/101, 115; 710/31, 710/33, 44, 46; 713/181
See application file for complete search history.

(56) References Cited

U.S. PATENT DOCUMENTS 4,713,780 A * 12/1987 Schultz et al. ............... 709/206

(Continued)

FOREIGN PATENT DOCUMENTS

EP 0622694 B1 10/1997

(Continued)

OTHER PUBLICATIONS

"The Sharp AR-507 Imager™ Wookgroup Digital Document System: High Performance Technology That Delivers," at least as early as May 28, 2005, 2 pages, Sharp, http://www.sharpusa.com/files/cop_dow_AR507ss.pdf.

(Continued)

*Primary Examiner*—Kimberly A Williams
(74) *Attorney, Agent, or Firm*—Law Office of Karen Dana Oster, LLC

(57) ABSTRACT

An effective method for securing the release of the transmission, rendering, and outputting of an imaging/print job at an imaging device, for imaging/print jobs that originate in traditional print/spooling subsystems include the following steps. A print job header is associated with an imaging/print job to form a headed imaging/print job. A secured release input (that may be input at a secured release input apparatus of the client host device) is associated with the print job header by including a secured release indicative command/code in the print job header. The headed imaging/print job is divided into data packets. Initial data packet(s) are transmitted to the imaging device. It is determined whether the secured release indicative command/code is present in the initial data packet(s). Acceptance of subsequent data packets of the headed imaging/print job are prevented if the secured release indicative command/code is present in the initial data packet(s). When a secured release input is received on a secured release input apparatus of the imaging device, subsequent data packets of the headed imaging/print job are accepted.

23 Claims, 16 Drawing Sheets

U.S. PATENT DOCUMENTS

| | | | |
|---|---|---|---|
| 4,799,153 A * | 1/1989 | Hann et al. | 726/3 |
| 4,958,298 A * | 9/1990 | Okamoto | 358/1.14 |
| 5,358,238 A | 10/1994 | Mandel et al. | |
| 5,592,536 A * | 1/1997 | Parkerson et al. | 455/462 |
| 5,630,029 A * | 5/1997 | Kosukegawa | 358/1.15 |
| 5,764,918 A * | 6/1998 | Poulter | 709/236 |
| 5,956,471 A * | 9/1999 | Ueda et al. | 358/1.14 |
| 5,970,218 A * | 10/1999 | Mullin et al. | 358/1.15 |
| 6,092,191 A * | 7/2000 | Shimbo et al. | 713/153 |
| 6,160,629 A | 12/2000 | Tang et al. | |
| 6,226,098 B1 | 5/2001 | Kulakowski et al. | 358/1.14 |
| 6,378,070 B1 | 4/2002 | Chan et al. | |
| 6,438,574 B1 | 8/2002 | Nagashima | |
| 6,442,607 B1 * | 8/2002 | Korn et al. | 709/225 |
| 6,545,769 B2 | 4/2003 | Collard et al. | |
| 6,687,018 B1 * | 2/2004 | Leong et al. | 358/1.15 |
| 6,751,732 B2 * | 6/2004 | Strobel et al. | 713/176 |
| 6,754,214 B1 * | 6/2004 | Mahalingaiah | 370/392 |
| 6,809,831 B1 * | 10/2004 | Minari | 358/1.15 |
| 6,943,907 B1 * | 9/2005 | Kim | 358/1.14 |
| 7,034,954 B1 * | 4/2006 | Utsunomiya | 358/1.16 |
| 7,203,959 B2 * | 4/2007 | Nachenberg et al. | 726/22 |
| 7,383,321 B2 * | 6/2008 | Moyer et al. | 709/219 |
| 7,443,527 B1 * | 10/2008 | Shigeeda | 358/1.15 |
| 7,503,064 B2 * | 3/2009 | Saltz | 726/11 |
| 2001/0038462 A1 | 11/2001 | Teeuwen et al. | |
| 2002/0066989 A1 | 6/2002 | Simpson | |
| 2002/0105666 A1 | 8/2002 | Sesek | |
| 2002/0145748 A1 * | 10/2002 | Nonoyama et al. | 358/1.14 |
| 2002/0171859 A1 | 11/2002 | Chen et al. | |
| 2003/0038965 A1 | 2/2003 | Simpson | |
| 2003/0044009 A1 | 3/2003 | Dathathraya | |
| 2003/0098989 A1 * | 5/2003 | Roos | 358/1.14 |
| 2003/0101342 A1 | 5/2003 | Hansen | |
| 2003/0105872 A1 * | 6/2003 | Han et al. | 709/229 |
| 2003/0197887 A1 * | 10/2003 | Shenoy et al. | 358/1.15 |
| 2003/0200439 A1 * | 10/2003 | Moskowitz | 713/176 |
| 2004/0080772 A1 * | 4/2004 | Snyders | 358/1.14 |
| 2004/0165211 A1 * | 8/2004 | Herrmann et al. | 358/1.15 |
| 2004/0181661 A1 | 9/2004 | Ferlitsch et al. | |
| 2005/0062998 A1 * | 3/2005 | Kumashio | 358/1.14 |
| 2005/0068564 A1 | 3/2005 | Ferlitsch | |
| 2005/0071659 A1 * | 3/2005 | Ferguson et al. | 713/193 |
| 2005/0216730 A1 * | 9/2005 | Morino et al. | 713/153 |
| 2005/0270567 A1 * | 12/2005 | Du et al. | 358/1.15 |
| 2005/0275887 A1 * | 12/2005 | Yamanaka | 358/1.15 |
| 2006/0001899 A1 * | 1/2006 | Kanno | 358/1.14 |
| 2006/0028661 A1 * | 2/2006 | Uruma | 358/1.6 |
| 2006/0176501 A1 * | 8/2006 | Yoshiura et al. | 358/1.15 |
| 2006/0268315 A1 | 11/2006 | Randt | |
| 2009/0049533 A1 * | 2/2009 | Kim | 726/7 |

FOREIGN PATENT DOCUMENTS

| | | |
|---|---|---|
| EP | 0935182 A1 | 8/1999 |
| EP | 1091285 A2 | 4/2001 |
| JP | 2001-26169 A | 1/2001 |
| JP | 2001051915 | 2/2001 |
| JP | 2002236570 | 8/2002 |
| JP | 2002297330 | 10/2002 |
| JP | 2002-370407 A | 12/2002 |
| JP | 2003025692 A | 1/2003 |
| WO | WO 02/41133 A2 | 5/2002 |

OTHER PUBLICATIONS

"Ricoh imagio Neo 350/450 Series Operating Instructions Security Reference," 2002, 74 pages, Ricoh Company, Ltd., Japan.

"PageCounter: Equitrac's Flexible Control Terminal," 2003, 2 pages, Equitrac Corporation, Florida.

"SafeCom™ Encryption," at least as early as May 28, 2005, 2 pages, MPI Tech, Denmark.

Takeshi Nakata, Japanese Office Action (Notification of Reasons for Refusal) for Patent Application No. 2006-152788 (Japanese version), Sep. 15, 2009, pp. 1-3, Interface Division—Fourth Patent Examination Department, Japan.

Takeshi Nakata, Japanese Office Action (Notification of Reasons for Refusal) for Patent Application No. 2006-152788 (English translation), Sep. 15, 2009, pp. 1-5, Interface Division—Fourth Patent Examination Department, Japan.

* cited by examiner

SECURED RELEASE METHOD AND SYSTEM FOR TRANSMITTING AND IMAGING A PRINT JOB IN WHICH A SECURITY ATTRIBUTE IN THE PRINT JOB HEADER WILL PREVENT ACCEPTANCE OF SUBSEQUENT DATA PACKETS UNTIL A USER PERFORMS AUTHENTICATION ON THE IMAGING DEVICE

BACKGROUND OF INVENTION

The present invention is directed to a secured release system to transmit and image a print job, and more specifically to a system for securing the release of the transmission, rendering, and outputting of a print job at an imaging device, for print jobs that originate in traditional print spooling subsystems.

In today's business environments, it is often advantageous to provide one peripheral device to service multiple users. For example, as shown in FIG. 1, users (e.g. a group of secretaries, an accounting department, or all the employees in a small business) working at host devices 100 (e.g. computers) may be networked to a single imaging device 102. An imaging device 102 may be, for example, an MFP (Multi-Function Peripheral/Printer/Product), a printer, a facsimile machine, a copier, a scanner, a filing device, a document conversion device, or any imaging device known or yet to be discovered. In the simplest configuration, the users request the imaging device's services, and the imaging device 102 automatically provides the services (e.g. automatic printing). Because the imaging device 102 is generally located remote from at least some of the users, it is often desirable to provide some form of interactive printing. Interactive printing provides some form of security to ensure privacy, confidentiality, and/or simply that the correct user will be able to pick up his "print job" (which includes any type of imaging job including, but not limited to print, fax, copy, scan, and document manipulation) without it being picked up by another user, misplaced, or discarded.

A spooler 104 transmits print data to a printer by entering ("spooling") the print data from client host devices 100 in a queue in order (e.g. the order of reception) and outputting ("de-spooling") the print data in a predetermined or dynamically prioritized order to the printer. Exemplary traditional print spooling subsystems include those found in MS WINDOWS® and AS/400®. Any device or mechanism capable of entering the print data from client host devices 100 in a queue, for purposes of this description, will be referred to as a spooler 104. Any application, device, or mechanism capable of outputting the print data to the printer, for purposes of this description, will be referred to as a de-spooler 106.

Users often want to transmit print jobs securely. FIGS. 2-6 show prior art systems used to transmit and image print jobs. All the prior art methods, however, have significant problems.

FIG. 2 shows an apparatus used in an encryption method of automatic printing that prevents unauthorized access to a print job by encrypting the print job. In one such encryption method, an unsecured print job 114a is encrypted (encrypted print job 114b) at the host device 100 during the de-spooling process and decrypted (decrypted print job 114c) on the imaging device 102. It should be noted that the print job may be encrypted either at the transport layer or data layer, between the host device 100 and the imaging device 102. While this method provides security from unauthorized access during the transmission, it does not protect the print job from being accessed after the print job 114d has been output to an output bin 116.

FIG. 3 shows an apparatus used in a secured release output bin method of interactive printing. In this method, a confidential print job 118a is imaged and output/held in secured release output bin 116a that is physically secured (e.g. using a lock and mechanical key) to prevent unauthorized retrieval or access to the print job 118a. Using a release mechanism (e.g. a key), the user is able to obtain access to an output bin 116b holding his print job 118b. It should be noted that the print job 118a in the output bin 116a is the physical document (print job 118b) that is in the output bin 116b, after the print job has been released. A variation of this system could include a mail-boxing system and sorter for feeding sheets from an imaging device 102 into multiple physically secured output bins where each output bin 116a is individually physically secured. When a user wants to keep his print job 118a confidential, he directs the output of the print job 118a to the respective secured output bin 116a to which he has physical access. One disadvantage of this method is that it requires a specially designed output bin. The multiple output bin 116a embodiment also requires a sufficient number of output bins 116a for distinct users with secured release rights (e.g. those having a key). Another disadvantage of this method is that it does not support any form of ad-hoc secured release.

FIG. 4 shows an apparatus used in a coded memory release method of interactive printing ("confidential print" or PIN printing). A confidential print job 122a (shown as Non-Output Imaged/Print Job 122a) is imaged and output/held in secured memory 120 that is secured using a coded virtual locking system (e.g. a code or personal identification number (PIN), herein after referred to as a secure release code 124) to prevent unauthorized retrieval or access to the confidential print job 122a. In this method, the secured memory 120 is memory or internal storage of the imaging device 102. The user may assign a secure release code 124 to a print job by entering the secure release code 124 during the generation of the print job. The secure release code 124 is generally hashed (one-way encryption) and the hash value is added to the confidential print job 122a. When the imaging device 102 receives the confidential print job 122a it is fully rasterized (RIP) as a confidential print job 122a to be held in the secured memory 120. The owner of the confidential print job 122a can then release the confidential print job 122a by entering the respective secure release code 124 at the operations panel 126 of the imaging device 102. Generally, the device will hash (e.g. MD5) the entered secure release code 124, using the same hash algorithm at the client side and compare it to the hash value stored in the confidential print job 122a. The RIP pages of the confidential print job 122a are then developed and output as an output print job 122b. One disadvantage of this method is that the RIP confidential print jobs 122a consume considerable storage space in the secured memory 120 of the imaging device 102. The secured memory 120 would have to have sufficient storage capacity to allow other secured and non-secured release jobs to be processed on the imaging device 102 while the RIP confidential print jobs 122a are stored. Thus, this may severely limit the number of confidential print jobs that can be processed at a time and, potentially, limit the number of non-confidential print jobs. Another disadvantage of this method is that if the imaging device 102 is physically compromised and the secured memory 120 is accessed while the RIP confidential print jobs 122a are stored, even if the confidential print jobs 122a are encrypted, they may contain visible "unencrypted" content. Yet another disadvantage of this method is that if confidential print jobs 122a are forgotten (i.e. not picked up by the issuer), the storage space used by the RIP confidential print jobs 122a is indefinitely consumed until an operator with the appropriate authorization is able to delete the confidential print jobs 122a from secured memory 120.

FIG. 5 shows an apparatus used in a coded memory execution and release method of interactive printing. In this method, both the host device 100 and imaging device 102 have an ID reader 130 (e.g. an optical reader) for entering an ID card 132. When the user submits a print job 134a, he inserts his ID card 132 into the ID reader 130 at the host device 100. The host device 100 imaging system then adds an ID code, generally hashed, to the print job 134a and transmits the ID code and print job to the imaging device 102 as unexecuted print job 134b. The unexecuted print job 134b is then stored in the imaging device 102. The user can access and execute (e.g. RIP and output) the print job 134c, 134d by entering his ID card 132 at the ID reader 130 of the imaging device 102. One disadvantage of this method is that the unexecuted print jobs 134b, while not RIP, can still consume significant storage space in the imaging device 102 memory. Another disadvantage of this method is that if the imaging device 102 is physically compromised and the storage therein is accessed while the unexecuted print job 134b is stored, the unexecuted print job 134b can be retrieved. If the unexecuted print job 134b is unencrypted, it could be processed at a different location to reveal the content. If the unexecuted print job 134b is encrypted, its contents could still be accessed if the encrypted code is hacked. Yet another disadvantage of this method is that if secured unexecuted print jobs 134b are forgotten (i.e. not picked up by the issuer) the storage space used by the forgotten unexecuted print job 134b is indefinitely consumed.

FIG. 6 shows an apparatus used in a remotely stored method of interactive printing. In this method, the user sends the print job 140a from the host device 100 to a secure release print server 142 along with a secure release code 143. The print job 140b is then held on the print server 142. The user releases the print job 140b by entering the secure release code 143 at the operation panel 144 of the imaging device 102. The imaging device 102 then contacts the secure release print server 142, passing it the entered secure release code 143. The print server then de-spools to the imaging device 102 the print job 140c related to the secure release code 143. The print job is then developed 140d and output as an output print job 140e to the output bin 116. While the print job is not held in a secured release mode on the imaging device 102, this method still suffers in that the print job 140 is held (taking up memory) at an intermediate location (i.e. secure release print server 142) between the host device 100 and the imaging device 102, which could be compromised. For example, an operator with print administration rights on the secure release print server 142 could make a copy of the print job 140c and process the print job 140c at another location.

BRIEF SUMMARY OF THE INVENTION

The present invention is directed to an effective method for securing the release of the transmission, rendering, and outputting of an imaging/print job at an imaging device, for imaging/print jobs that originate in traditional print/spooling subsystems.

The method includes the following steps. A print job header is associated with a first imaging/print job to form a headed imaging/print job. A secured release input (that may be input at a secured release input apparatus of a client host device) is associated with the print job header by including a secured release indicative command/code in the print job header. The headed imaging/print job is divided into data packets. Initial data packet(s) are transmitted to the imaging device. It is determined whether the secured release indicative command/code is present in the initial data packet(s). Acceptance of subsequent data packets of the headed imaging/print job are prevented if the secured release indicative command/code is present in the initial data packet(s).

When a secured release input is received on a secured release input apparatus of the imaging device, subsequent data packets of the headed imaging/print job are accepted.

In one preferred embodiment, the subsequent data packets are retained on the client host device until they are released.

In one preferred embodiment, the pre-existing print subsystem does not need to be modified.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
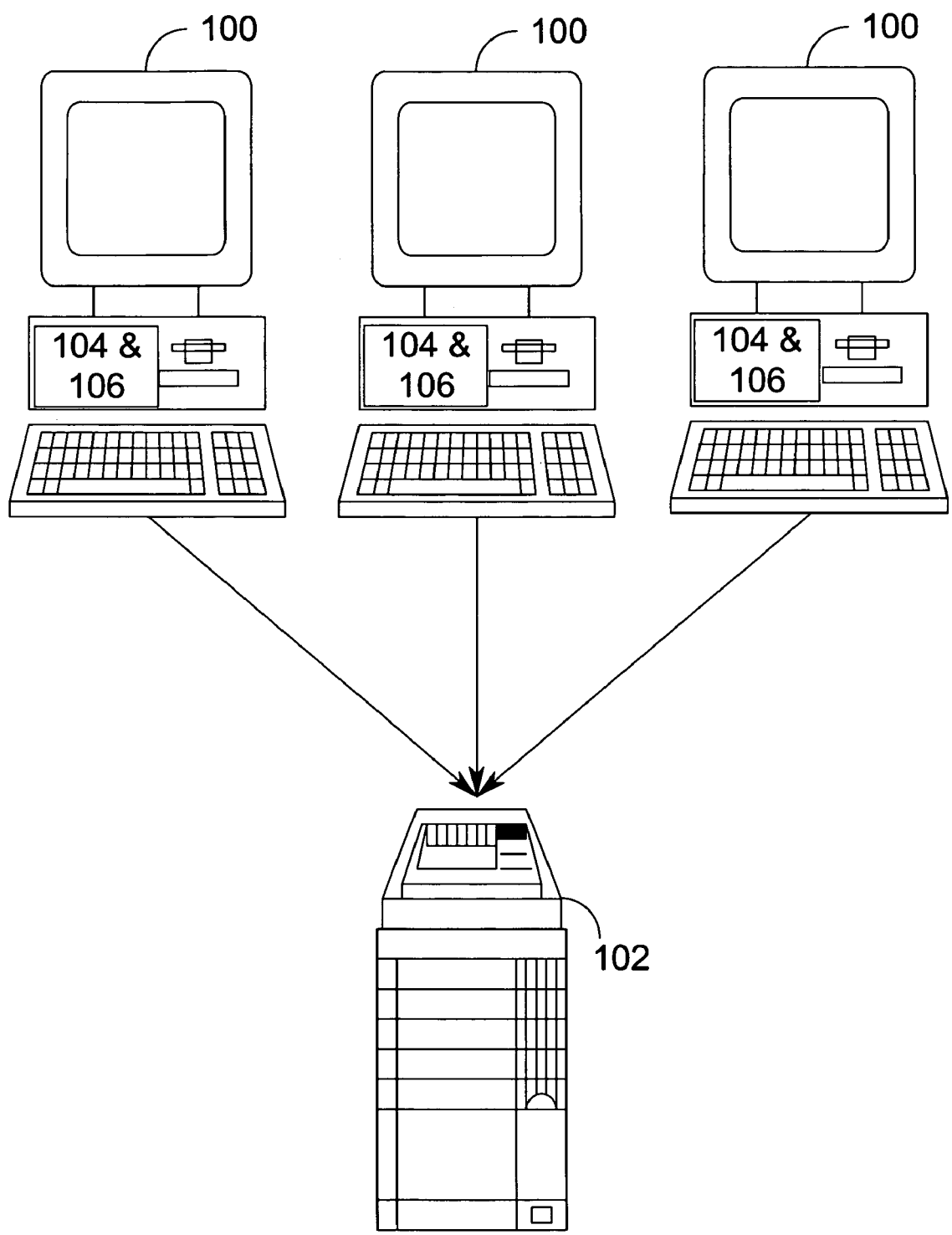
FIG. 1 illustrates an exemplary computer network environment for implementing the system and method of the present invention.
Figure 2:
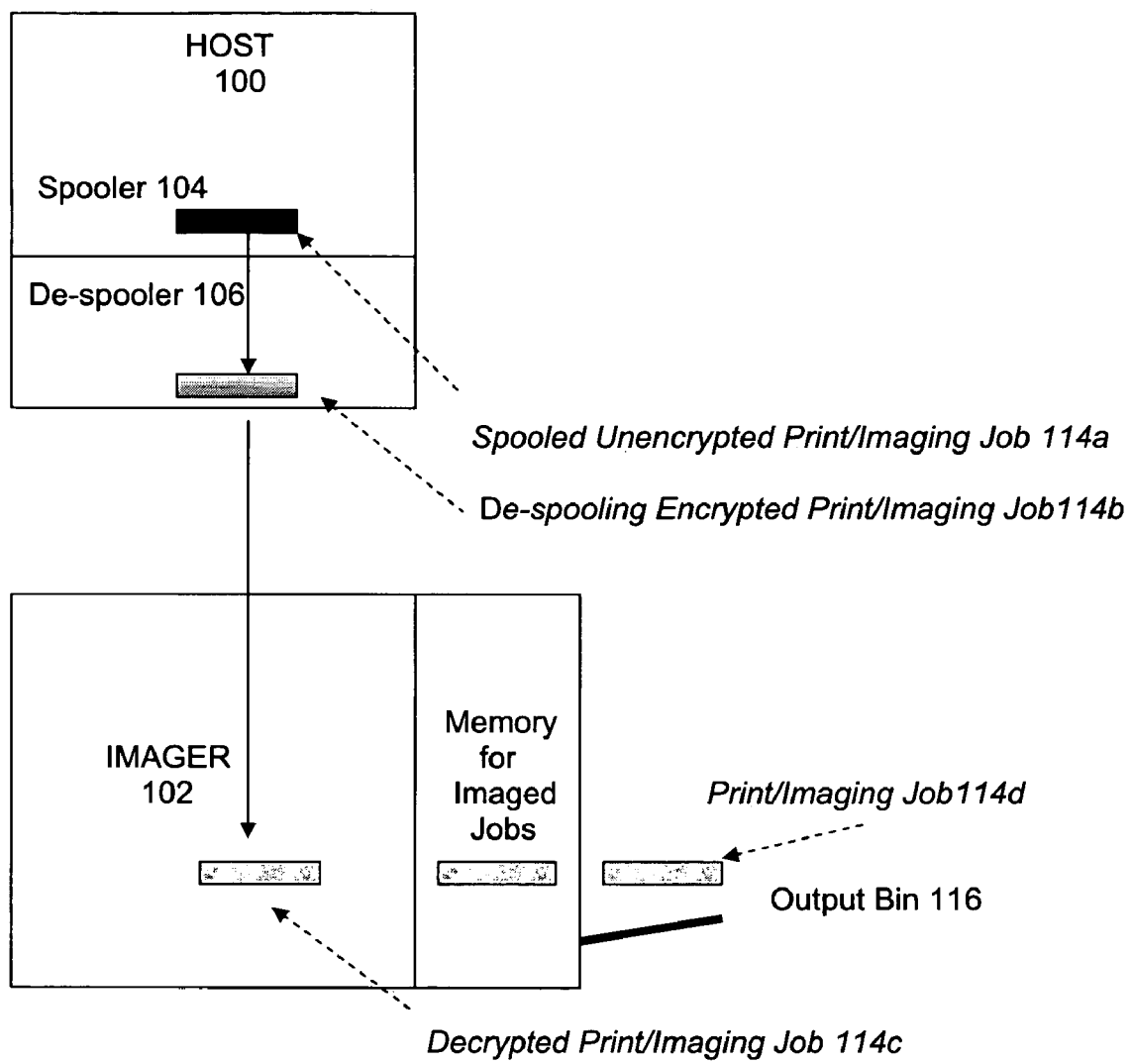
FIG. 2 is a schematic diagram of a prior art embodiment of a host device and imaging device for implementing an encryption method of interactive printing.
Figure 3:
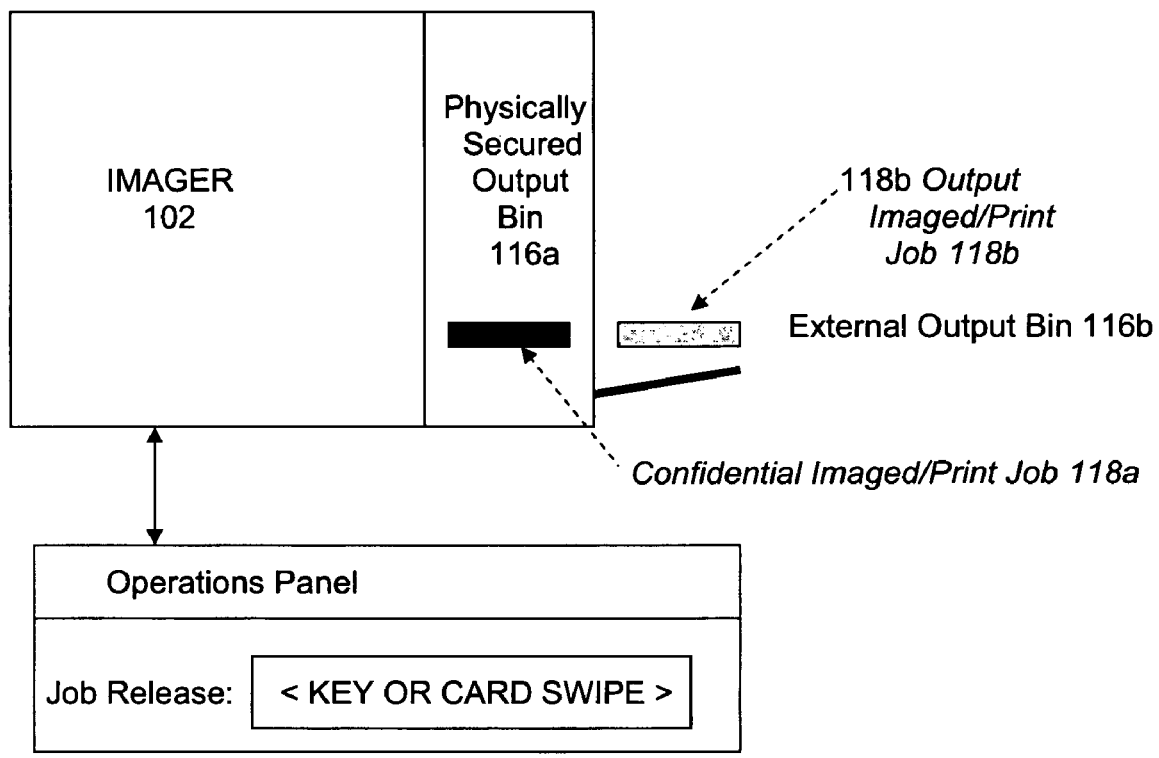
FIG. 3 is a schematic diagram of a prior art embodiment of a host device and imaging device for implementing a secured release output bin method of interactive printing.
Figure 4:
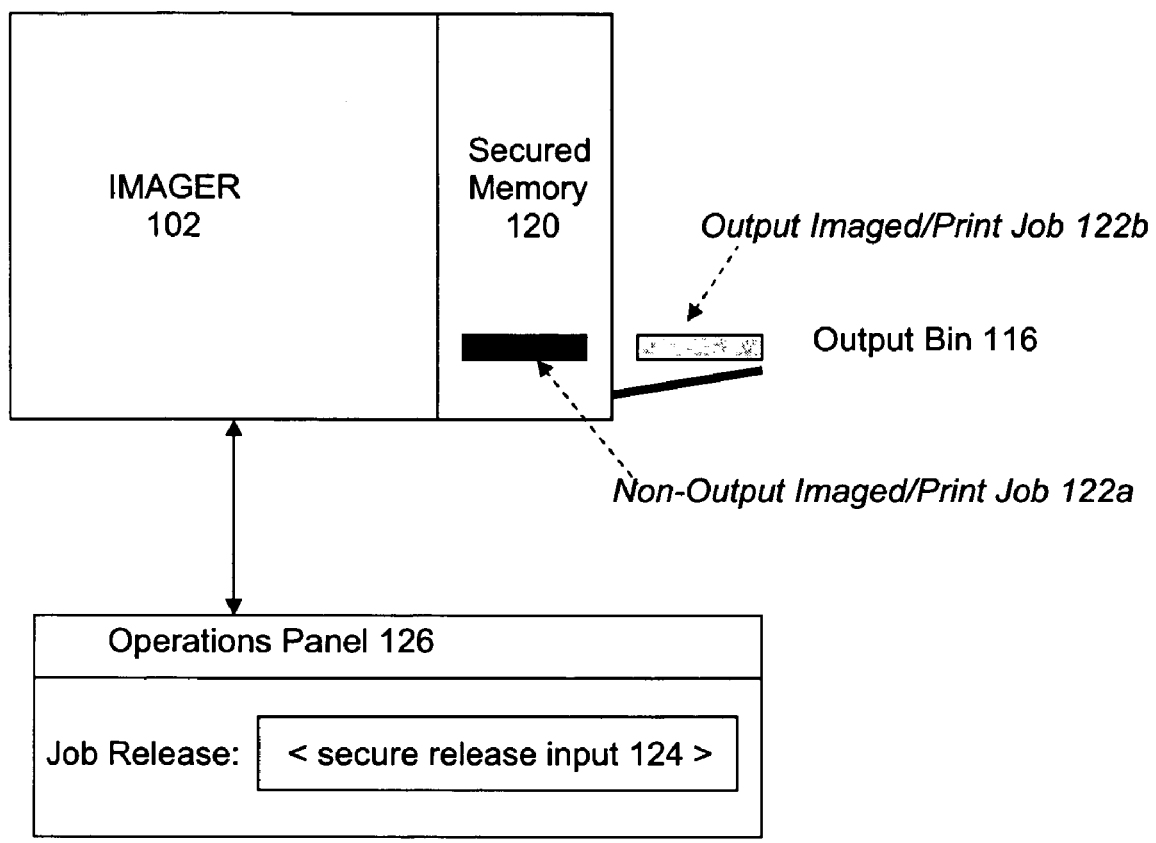
FIG. 4 is a schematic diagram of a prior art embodiment of a host device and imaging device for implementing a coded memory release method of interactive printing.
Figure 5:
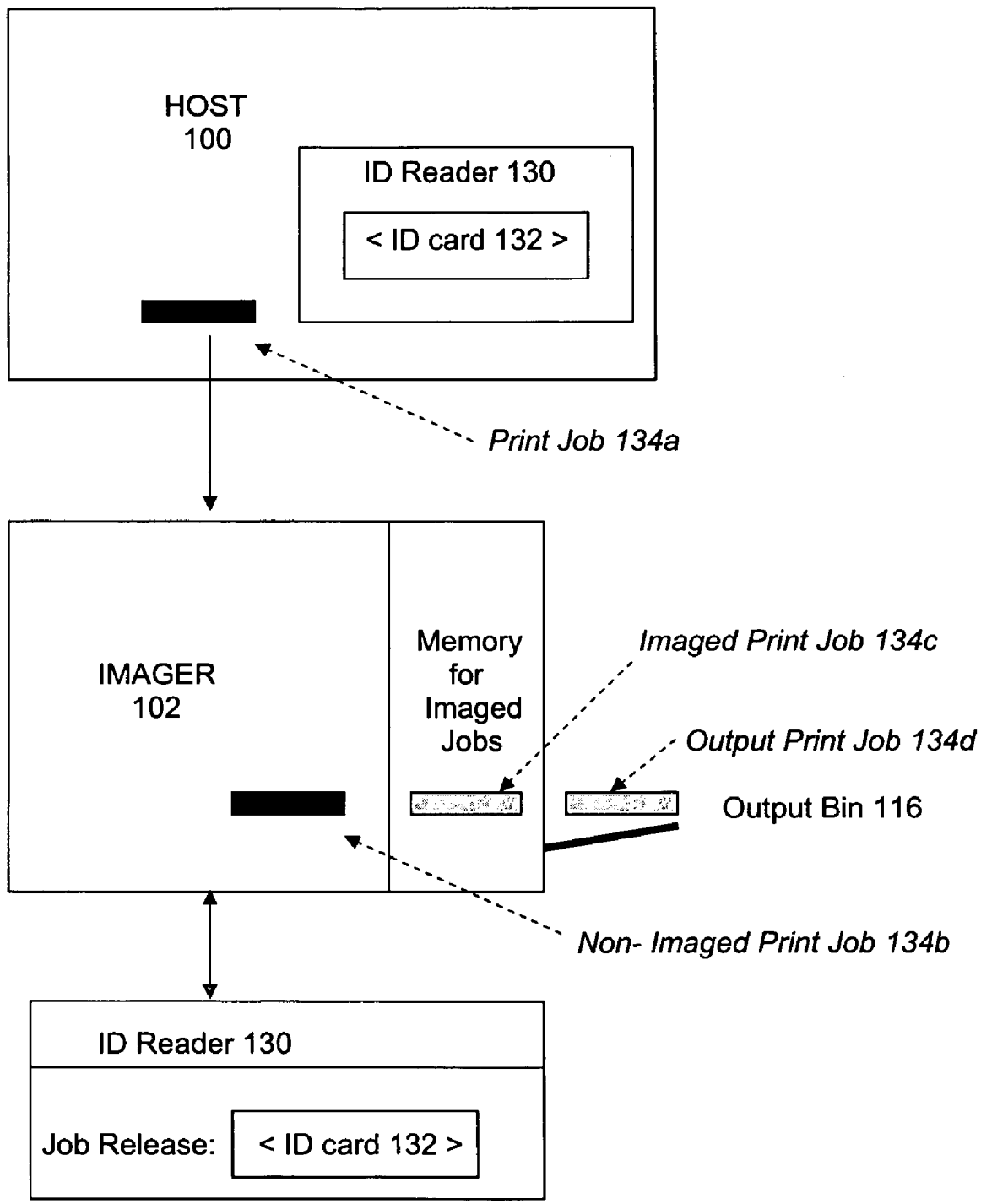
FIG. 5 is a schematic diagram of a prior art embodiment of a host device and imaging device for implementing a coded memory execution and release method of interactive printing.
Figure 6:
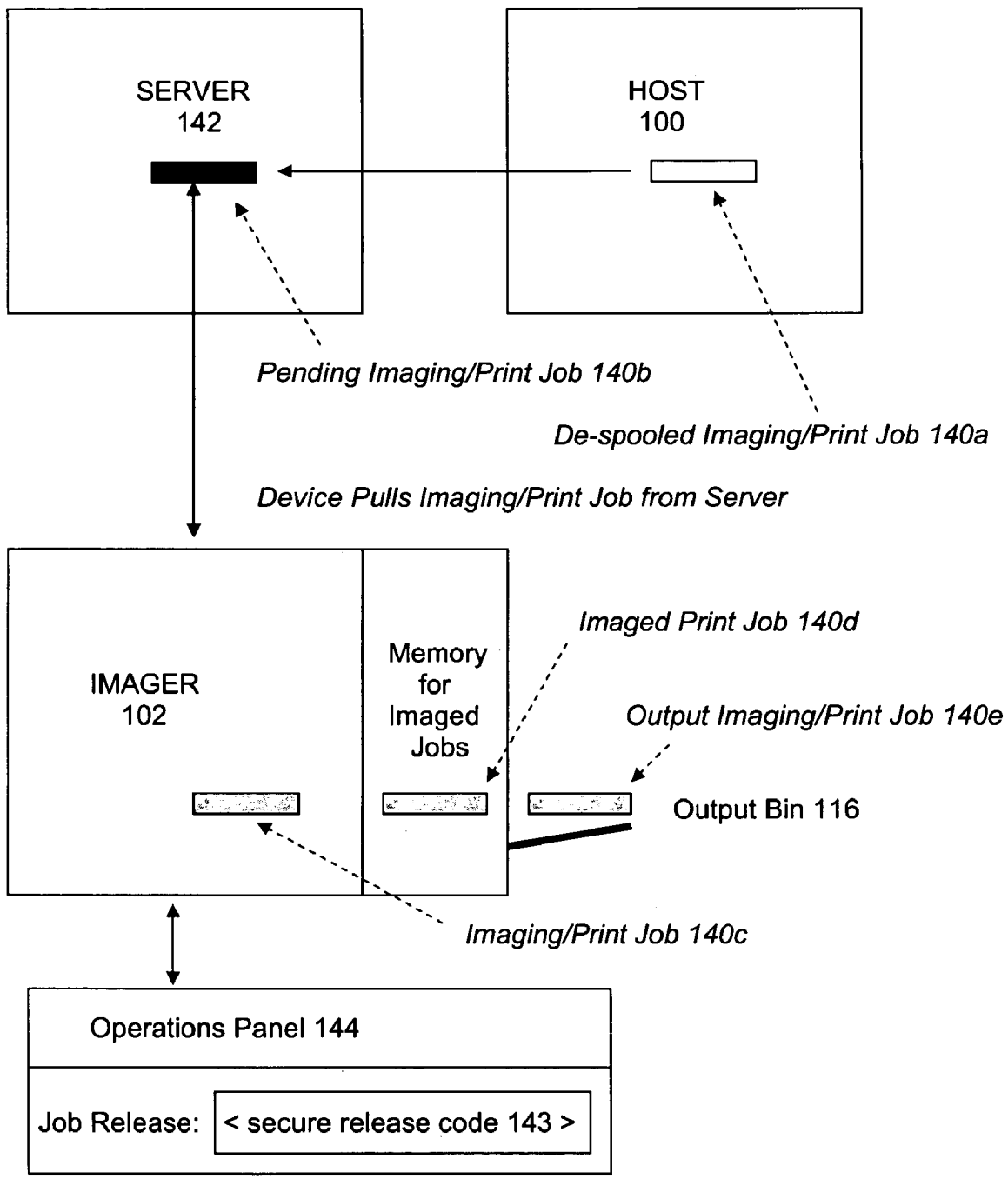
FIG. 6 is a schematic diagram of a prior art embodiment of a host device and imaging device for implementing a remotely stored method of interactive printing.

The present invention is directed to an effective system for securing the release of an imaging/print job, where the imaging/print job is retained on the client host device 100 until it is securely released to an imaging device 102.

The present invention uses a headed imaging/print job 150 (FIG. 7) that includes a print job header 152 and an imaging/print job 154a. If the imaging/print job (e.g. a document) is to be securely released, the print job header 152 includes a secured release indicative command/code 156. The headed imaging/print job 150 may be divided into data packets (shown as 150a, 150b, 150c).

The system preferably works with a pre-existing host device 100 and its print subsystem (e.g. print spooler 104 and de-spooler 106 (e.g. print processor and port monitor)). Preferably the host device 100 print subsystem does not need to be modified except for the installation of a corresponding imaging device driver 160 (e.g. a printer driver). The imaging device driver 160 may be installed as software or may be a hardware/firmware device. An optional specialized secured release input apparatus 164 (which is a system that accepts a secured release input (SRI) 162) may also be added to the host device 100.

Figure 7:
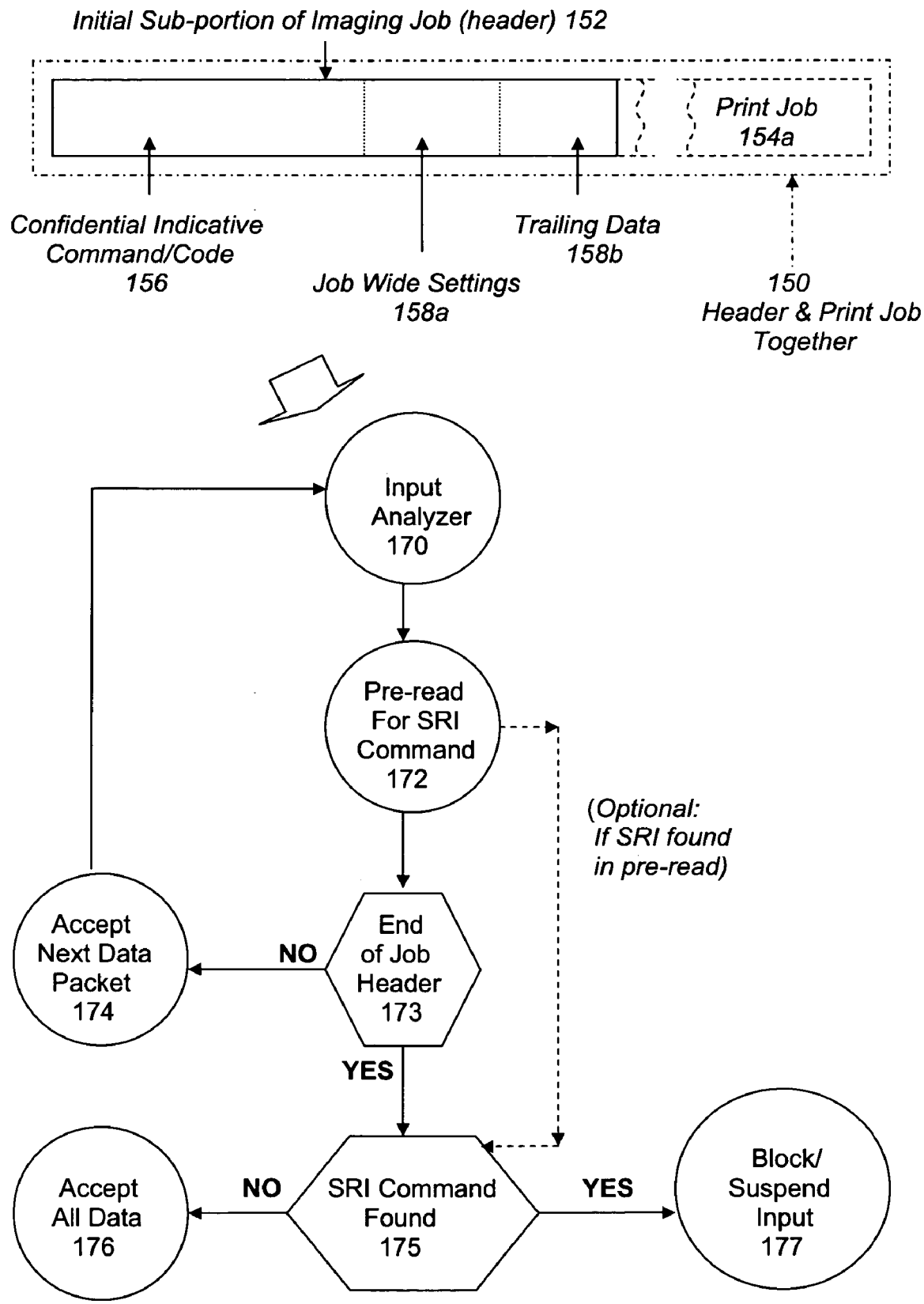
FIG. 7 is a flow diagram of a header in the input analyzer of an imaging device using one exemplary method of the present invention.

Another component of the present invention is the input analyzer 170 (FIG. 7). An initial data packet 150a is sent to the input analyzer 170. If the input analyzer 170 determines that a secured release indicative command/code 156 is present in the print job header 152 (which may be in one or more initial data packets 150a), the imaging device 102 prevents acceptance of subsequent data packets (e.g. 150b, 150c) on the corresponding logical channel/port from which the headed imaging/print job 150 originates. "Preventing acceptance" can be accomplished by blocking or suspending receipt of subsequent data packets (e.g. 150b, 150c) on a corresponding logical channel(s)/port(s).

The present invention could be implemented as a specialized imaging device 102 that includes an input analyzer 170 and a mechanism for entering a secure release input 162. The present invention could also work with less sophisticated or pre-existing imaging devices 102. One way that the present invention could work with any imaging device 102 would be to modify the imaging device 102 to include an input analyzer 170 and/or a mechanism for entering a secure release input 162. Another way that the present invention could work with a pre-existing imaging device 102 would be to provide a specialized interspersed device (see FIGS. 15 and 16) functionally between the de-spooler 106 of the client host device 100 and the imaging device 102. The specialized interspersed device could include, for example, an input analyzer 170 and/or a mechanism for entering a secure release input 162.

In preferred embodiments, while preventing acceptance of a secured release print job on one logical channel/port, other print jobs (secured or non-secured) may be received and analyzed on other logical channels/ports.

From a user's point of view, requesting imaging of a secured release print job using the present invention is a simple procedure. If the user wants to print a confidential document using the secured release feature, the user requests imaging of the imaging/print job 154a from an application program (e.g. MS-Word®). The user is then prompted to enter a secured release input 162 that he enters at the secured release input apparatus 164 of the host device 100. The user subsequently goes to an associated imaging device 102 to retrieve the print job. It should be noted that preferred embodiments of the present invention would allow the user to delay print job retrieval without delaying the imaging of other users' print jobs. To retrieve the print job (FIG. 14), the user enters the secured release input 162 on the secured release input apparatus 166 of the imaging device 102 (shown as operations panel 166). The user then removes the imaging/print job 154b from the output bin 116 of the imaging device 102.

Headed Imaging/Print Job

FIG. 7 shows an exemplary headed imaging/print job 150 that includes a print job header 152 and an imaging/print job 154a (e.g. imaging data). The print job header 152 may be any type of initial portion added to, augmented to, appended to, incorporated into, linked with, or transformed to include or be included with (herein afterwards referred to as "associated with") the imaging/print job 154a. The print job header 152 may take the form of a separate portion, a file, commands, and/or code. In preferred embodiments of the present invention, the print job header 152 includes a secured release indicative command/code 156 if the document is to be securely released. The secured release indicative command/code 156 may be added to, augmented to, appended to, incorporated into, linked with, or transformed to include or be included with (herein afterwards referred to as "associated with") the print job header 152. The print job header 152 may include other information such as job wide settings 158a, trailing data 158b, and other settings, commands, and/or code. The headed imaging/print job 150 may be divided into data packets (shown as 150a, 150b, 150c in FIG. 8).

The secured release input 162 is "related to" the secured release indicative command/code 156 of the print job header 152. "Related to" means that the secured release input 162 and secured release indicative command/code 156 may be matched, analyzed, found (e.g. using a look-up function), or otherwise compared or contrasted such that appropriate secured release inputs 162 will allow access to documents having the respective secured release indicative command/codes 156.

It should be noted that the secured release input 162 that is input at the secured release input apparatus 164 of the host device 100 may be different from the secured release input 162 that is input at the secured release input apparatus 166 at the imaging device 102. It should also be noted that there may be more than one secured release input 162 that corresponds to each secured release indicative command/code 156. For example, there may be a master secured release input 162 that would release all secured release print jobs.

It should be noted that the headed imaging/print job 150 may be divided into data packets (shown as 150a, 150b, 150c) of the same size or of different sizes. It should also be noted that the size(s) may be pre-determined, specified by the user, or determined dynamically. In one embodiment, at least the first initial data packet is set to be the exact size of the print job header 152.

For exemplary purposes, the generation of a headed imaging/print job 150 may be accomplished using the following methods. In one method, a headed imaging/print job 150 may be generated using an imaging device driver 160 to convert application data to headed imaging/print job 150. In another method, a direct submit application produces a headed imaging/print job 150 that is subsequently transformed or augmented to include the secured release input 162. The direct submit application then encapsulates the application/image data with the secured release input 162 (where the native format of the data is interpreted by the imaging device 102).

Input Analyzer

FIG. 7 shows the process used by the input analyzer 170. The input analyzer 170 determines whether a secured release indicative command/code 156 is present in the print job header 152. If it is found, the imaging device 102 prevents acceptance of subsequent data packets on the corresponding logical channel/port from which the headed imaging/print job 150 originated.

As shown in FIG. 7, at least one initial data packet 150a of a headed imaging/print job 150 is sent to the input analyzer 170. As the imaging device 102 receives the initial data packet(s) 150a of the print job, the input analyzer 170 pre-reads 172 the data to detect a secured release indicative command/code 156 that is indicative of a secured release print job. Pre-reading may be thought of as performing an analysis on the data prior to the acceptance of subsequent packets. If the end of the print job header 152 has not been reached 173, the next initial data packet(s) 150a will be accepted 174. The data indicative of the end of the print job header 152 may be a pre-known command syntax, such as the PJL statement @PJL ENTER LANGUAGE=<format> as specified by Hewlett Packard PJL command syntax.

Once the complete print job header 152 has been received 173 (e.g. the data packet with the end of print job header 152 is encountered), a determination is made as to whether a secured release indicative command/code 156 has been detected. As part of the analysis process of this determination, the data packet(s) is parsed for data indicative of a secured release indicative command/code 156 according to a pre-known command syntax, such as the print job language (PJL) statement @PJL SET SUSPENDKEY="<PIN>" implemented by the Sharp AR-507 and AR-M450 digital imaging devices.

If no such secured release indicative command/code 156 is detected 175 in the print job header 152, the print job is treated as normal and is fully accepted 176, received, and queued in the imaging device 102. In general, normal processing means that the imaging device 102 continues to accept data packets without suspension according to its storage and bandwidth capacity.

On the other hand, if a secured release indicative command/code 156 is encountered, the input analyzer 170 may designate or tag the headed imaging/print job 150 as being confidential (e.g. a secured release print job). If the print job is confidential, the imaging device 102 prevents acceptance 177 of subsequent data packets (e.g. 150b, 150c) on the corresponding logical channel/port associated with the print job. It should be noted that preventing acceptance 177 may be accomplished by blocking (the I/O output from the port monitor on the client host device 100 is blocked) or suspending receipt of subsequent data packets (e.g. 150b, 150c) on corresponding logical channel(s)/port(s). This prevention of acceptance may be implemented at the transport layer. If a secured release indicative command/code 156 is discovered, subsequent data packets may, optionally, not be analyzed by the input analyzer 170.

The logical channel/port then stays in a suspension mode until the user initiates the secured release. To retrieve the print job, the user would enter the secured release input 162 on the operations panel 166.

It should be noted that the shown order of the process in FIG. 7 is exemplary and may be modified. For example, if the secured release indicative command/code 156 is detected during the pre-read step 172, the imaging device 102 can immediately prevent acceptance of subsequent data packets. This is shown with the phantom line between pre-read step 172 and detected step 175.

It should be noted that while the data packets are being analyzed, the input analyzer 170 may parse the data for commands indicative of other print job attributes that would facilitate a user in identifying his print job, such as the job name, the document name, and the user name.

The input analyzer 170 may, for example, be installed/added to the system as a software upgrade, preinstalled as software, or implemented as hardware.

Exemplary Embodiments

Figure 8:
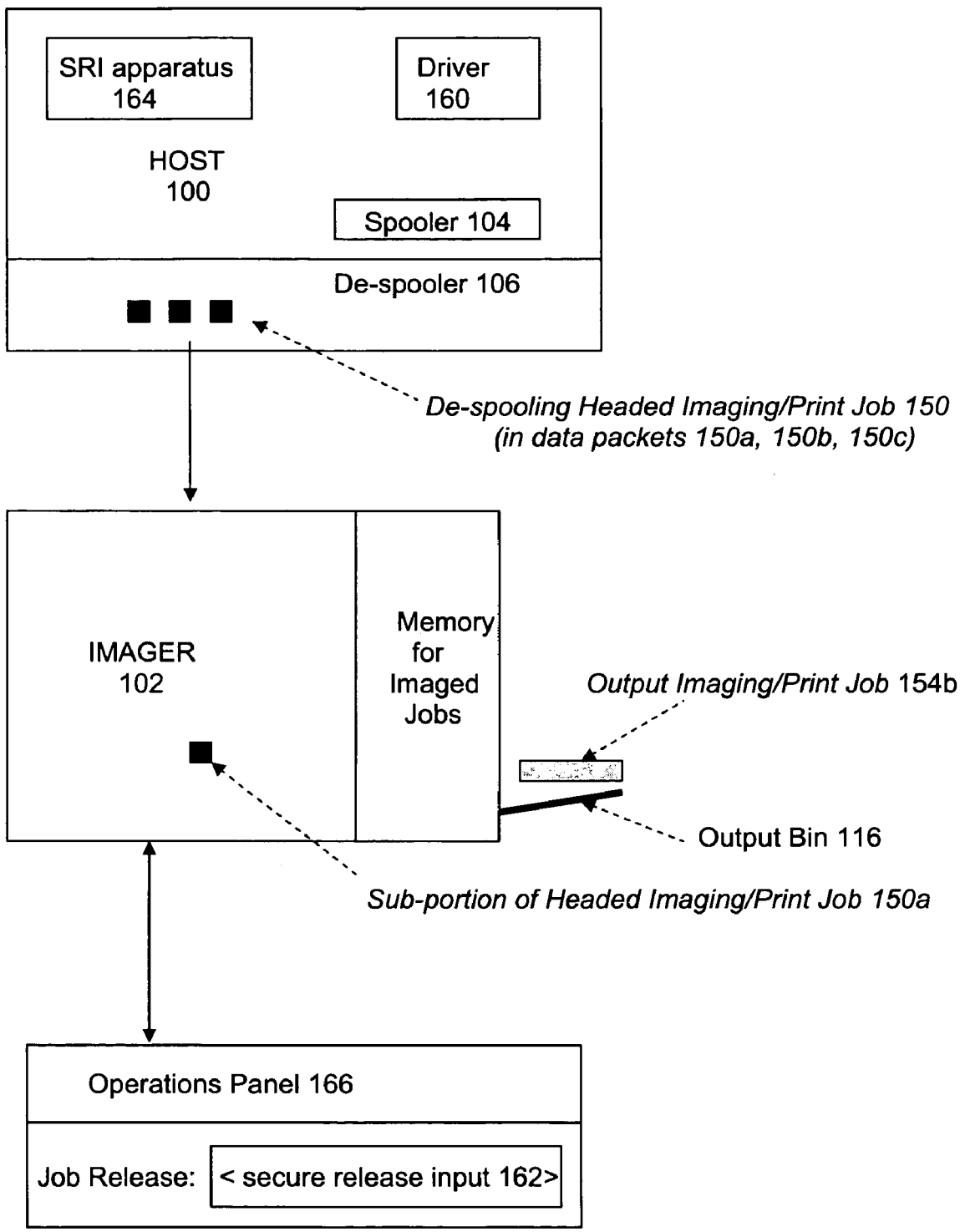
FIG. 8 is a schematic diagram of an exemplary system of the present invention including a host device and an imaging device for implementing a host device stored release method of interactive printing.

FIG. 8 shows an exemplary preferred embodiment of the present invention in which the user requests the imaging of a secured release imaging/print job 154a. Specifically, this figure shows a client host device 100 having a pre-existing imaging spooling/de-spooling subsystem 104, 106 (host device print subsystem) and an imaging device (printer) driver 160. The pre-existing host device 100 print subsystem includes, for example, a print spooler 104, a graphical display interface (GDI) in MS-WINDOWS®, and a de-spooler 106. The imaging device driver 160 may be used for generating a print job with an embedded instruction that indicates a secured release print job. For purposes of this example, the imaging device 102 includes an input analyzer 170 and a mechanism (operations panel 166) for entering a secure release input 162.

After a print job is created using an application program (e.g. a word processing program, a spread sheet program, or a graphic program), the user requests imaging (initiates the de-spooling) of a secured release print job from the application program (or a secondary program). For example, the user may initiate the de-spooling of a print job by scheduling a print job through the print spooler 104.

The user may be prompted to enter a secured release input 162, which he enters at the secured release input apparatus 164. Alternatively, a secured release input 162 may be automatically applied to all print jobs originating from a particular host device 100, to all print jobs having pre-defined destinations, or to some other subset of print jobs.

The imaging device driver 160 creates a headed imaging/print job 150 associated with the secured release input 162 (or other command/code indicative of the secured release input 162), preferably in a print job header 152. The headed imaging/print job 150 (imaging device ready data) is preferably prepared in a series of data packets 150a, 150b, 150c. The initial data packet(s) 150a preferably includes all or part of the print job header 152.

The headed print job 150 is spooled to the print spooler 104 and de-spooled to the imaging device 102. For example, the de-spooler could be a print processor and port monitor invoked via a spooler thread specific to the driver 160. The port monitor, running under the imaging device specific spooler thread, initiates a protocol (e.g. line printer remote (LPR)) for transmitting the print job to the imaging device 102 in a stream of data packets 150*a*, 150*b*, 150*c*. Once the host device 100 print subsystem starts the de-spooling of the print job, the spooler 104 creates or assigns the spooler thread specific to the imaging device 102, and initiates the de-spooling process from this specific thread. The spooler parent and other child threads continue to run asynchronous to this specific thread.

Figure 10:
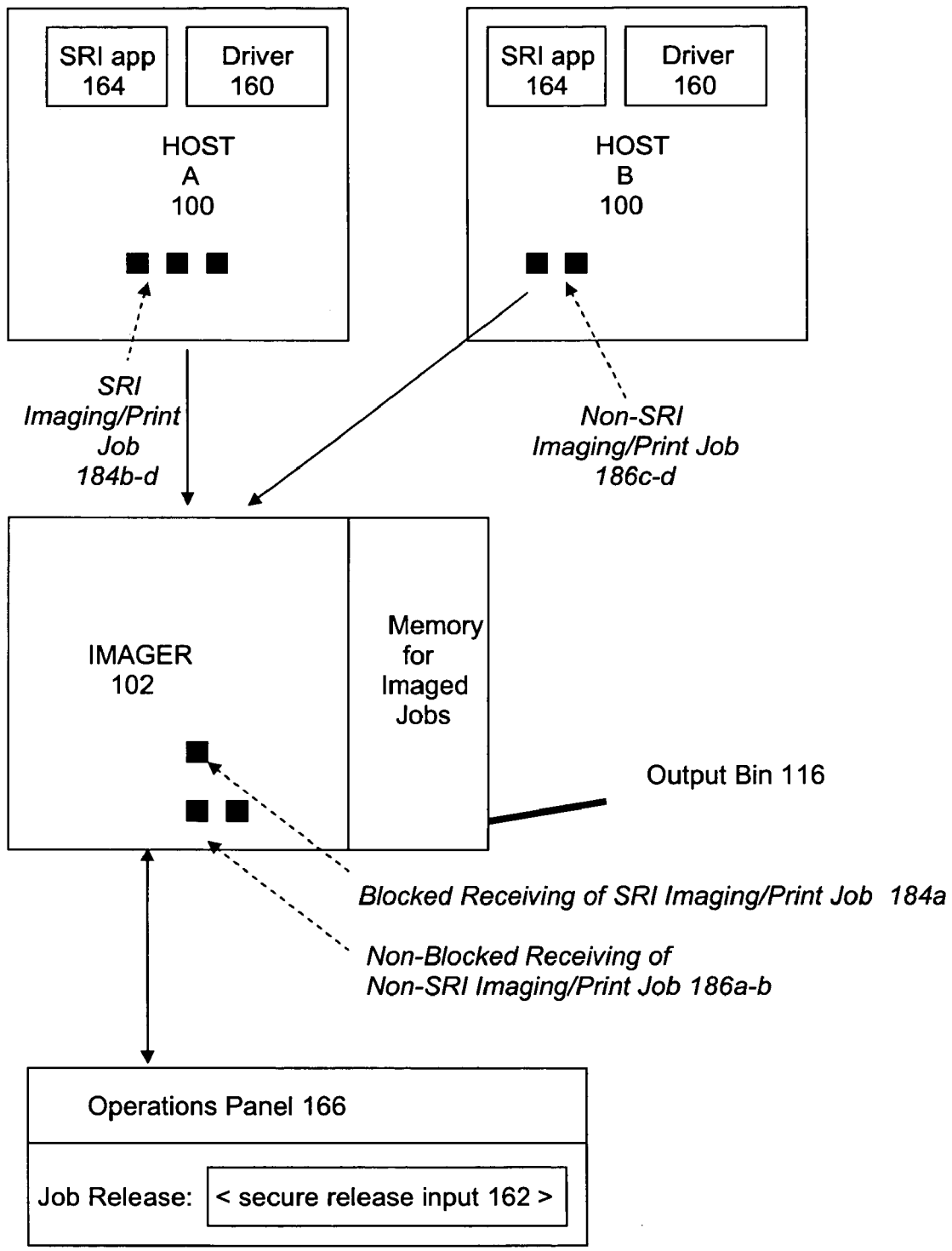
FIG. 10 is a schematic diagram of one preferred two-host system in which I/O of a secured release print job from one host device is prevented from being accepted while I/O of a non-secured release print job from another host device is accepted.
Figure 11:
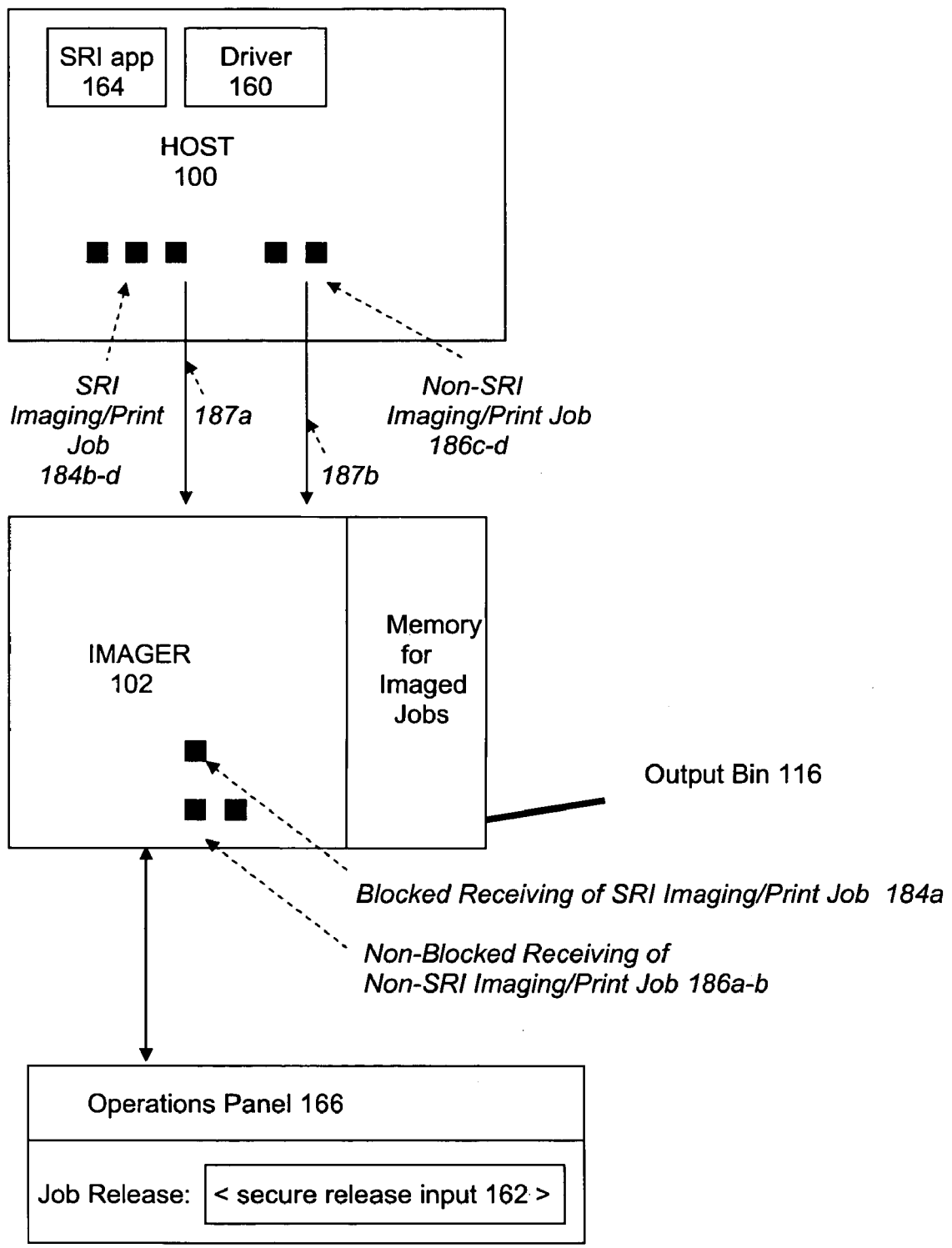
FIG. 11 is a schematic diagram of a preferred one-host system in which I/O of a secured release print job from a host device is prevented while I/O of a non-secured release print job from the same host device is accepted.
Figure 12:
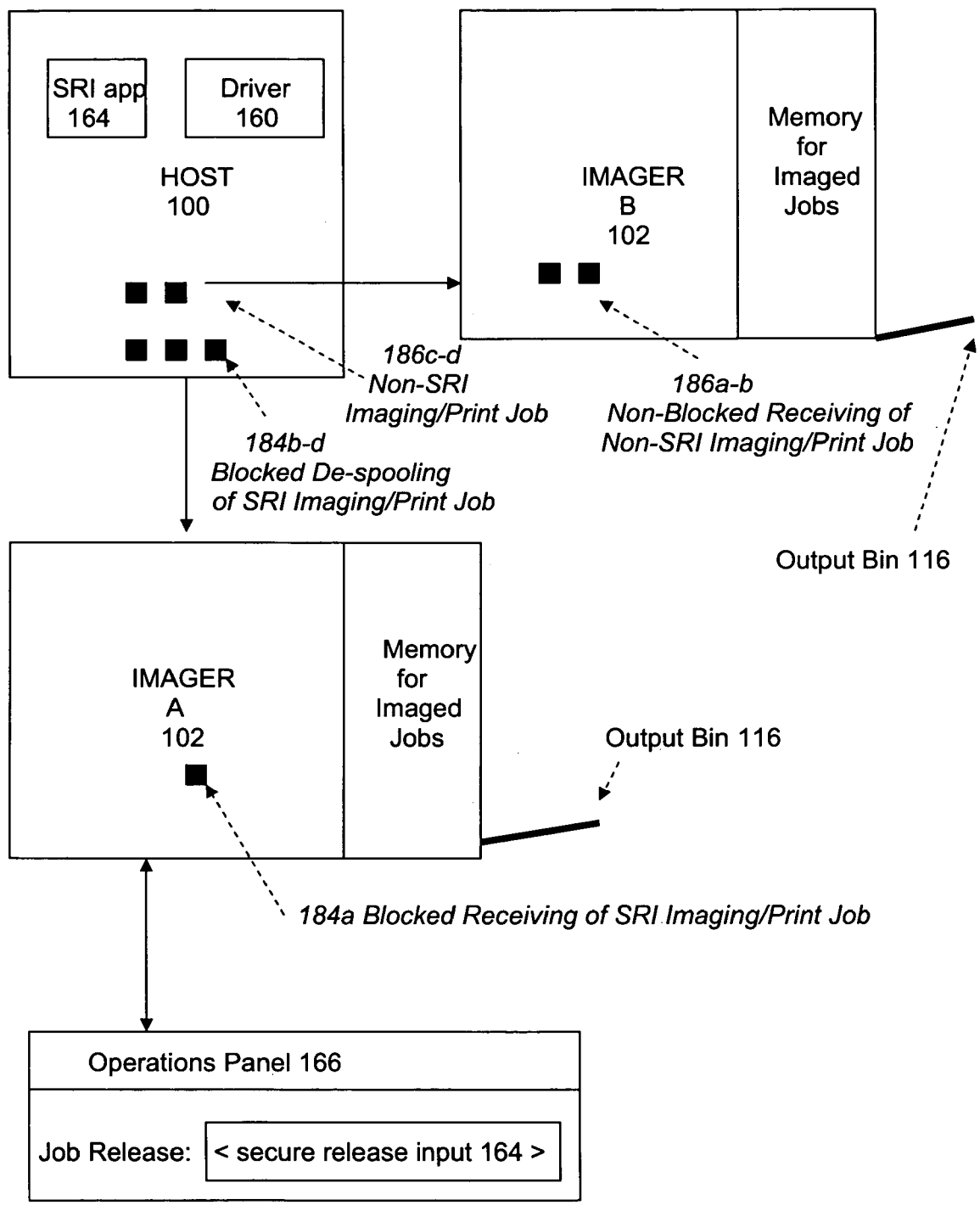
FIG. 12 is a schematic diagram of a preferred one-host system with multiple logical input channels/ports to connect to multiple imaging devices so that after acceptance is prevented of a secured release print job, the host may continue to print other print jobs from other logical input channels/ports which have received acceptance or do not require acceptance.

The de-spooling process establishes a connection to the imaging device 102 (e.g. TCP/IP in a network connected imaging device 102) via a logical channel/port (e.g. LPR, IPP, 9100 port). Using a logical channel/port, multiple client host devices 100 can establish simultaneous connections to the same channel/port of an imaging device 102 (e.g. as shown in FIG. 10). Further, using a logical channel/port, a single client host device 100 can establish simultaneous connections to the same channel/port of an imaging device 102 (e.g. as shown in FIG. 11). Still further, using a logical channel/port a single client host device 100 can establish multiple simultaneous connections to multiple imaging devices 102 over different channels/ports (e.g. as shown in FIG. 12).

Once the connection to the logical channel/port is established, the client host device 100 and imaging device 102 use a printing protocol to transfer the print job in a sequential sequence of data packets. A protocol handshaking occurs between the client host device 100 and imaging device 102 to acknowledge receipt/acceptance of each data packet.

As the imaging device 102 receives the initial data packet(s) 150*a* of the print job, the input analyzer 170 determines whether a secured release indicative command/code 156 is present in the print job header 152. If no such secured release indicative command/code 156 is detected 175 in the print job header 152, the print job is treated as normal and is fully accepted 176, received, and queued in the imaging device 102. However, if a secured release indicative command/code 156 is found, the imaging device 102 prevents acceptance of subsequent data packets (e.g. 150*b*, 150*c*) on the corresponding logical channel/port from which the headed imaging/print job 150 is being sent.

The logical channel/port then stays in a suspension mode until the user initiates the secured release as discussed in connection with FIG. 14.

The specifics of the embodiment shown in FIG. 8 are provided for purposes of best mode and enablement and are not meant to limit the scope of the invention.

Figure 9:
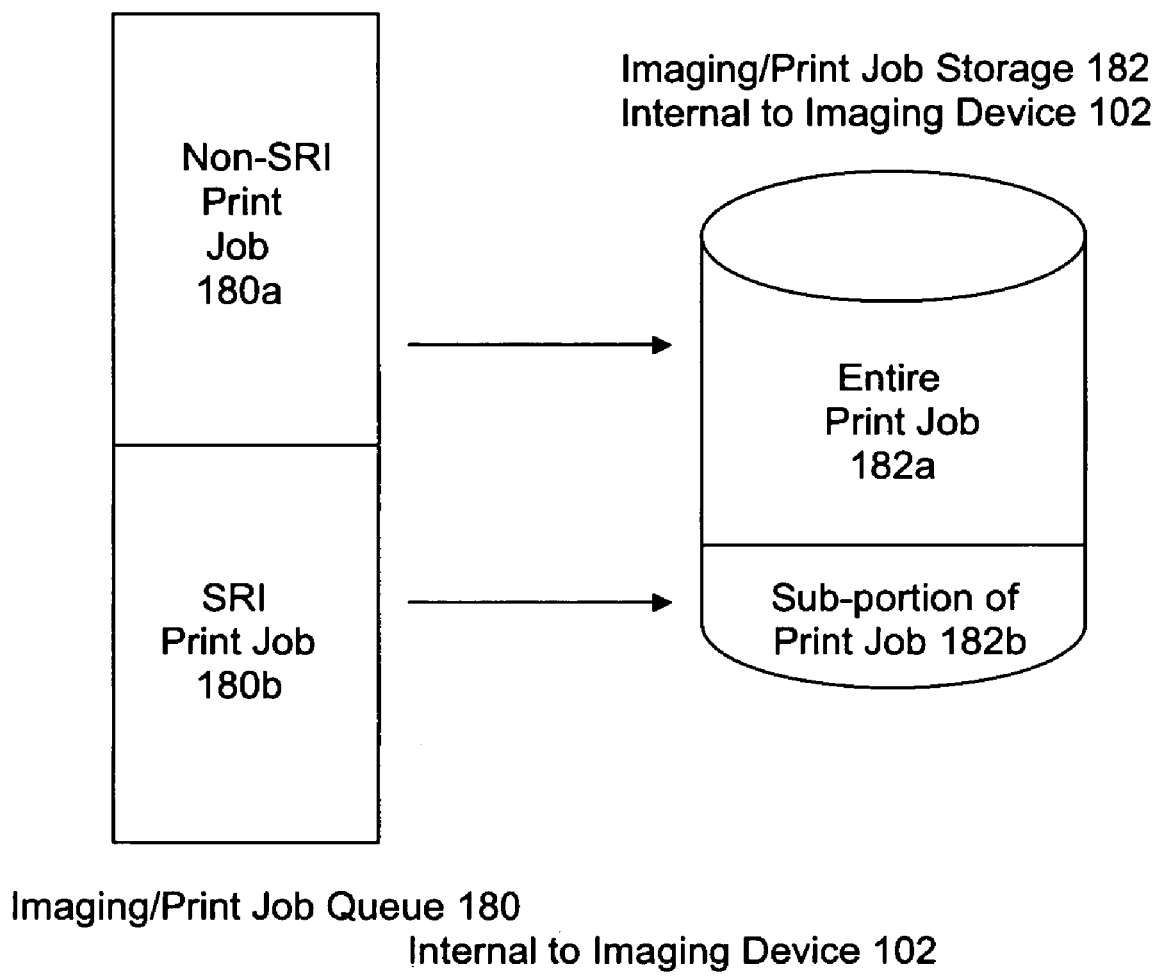
FIG. 9 is a schematic diagram of an internal imaging job queue for storing confidential and non-secured release print jobs on an imaging device.

FIG. 9 shows an example of how the imaging device 102 queues (imaging/print job queue 180) non-secured release print jobs 180*a* (e.g. automatic print jobs) and secured release print jobs 180*b* (headed imaging/print job 150). In this embodiment, the imaging device 102 has the capability to store some, if not all, of a print job in imaging/print job storage 182 (e.g. storage such as RAM, a hard disk, or an externally secured storage device).

For non-secured release print jobs 180*a*, the entire print job 182*a* may be stored in imaging/print job storage 182 until the imaging device 102 is ready to process the print job. For secured release print jobs 180*b*, only the sub-portion of the print job 182*b* up to the initial data packet(s) 150*a* containing the secured release indicative command/code 156 is stored in imaging/print job storage 182 until the print job is securely released and the imaging device 102 is ready to process the secured release print jobs 180*b*. The remaining data packets (e.g. 150*b*, 150*c*) containing the confidential imaging/print job 154*a* remains on (or are retained by) the host device 100 that, presumably, is more secure.

Using the imaging/print job storage 182 shown in FIG. 9 creates two significant advantages of the present invention: security and memory savings. Since only a sub-portion of the print job 182*b* (primarily the print job header 152) of the secured release print jobs is stored in the imaging/print job storage 182 of the imaging device 102, little if any secure information may be retrieved from the imaging device 102 should security be compromised. Since only a sub-portion of the print job 182*b* of the secured release print jobs is stored in the imaging/print job storage 182 of the imaging device 102, there is significant memory/storage space savings.

FIG. 10 shows an example of how the imaging device 102, while preventing acceptance (shown as "blocked") of a secured release print job 184 (shown as 184*a-d*) from a first host device 100 (Host A), may receive print jobs 186 (shown as 186*a-d*) from a second host device 100 (Host B). This figure can be interpreted as showing Host A sending initial data packet(s) 184*a* of a secured release print job 184 to the imaging device 102. The remaining blocked/suspended data packet(s) 184*b-d* remains on Host A. Before, during, or after Host A sends the initial data packet(s) 184*a*, Host B sends a non-secured release print job 186 (shown in progress with data packets 186*a-b* transmitted to the imaging device 102 and data packets 186*c-d* to be transmitted). Without waiting for the secured release print job 184 to be imaged, the imaging device 102 can image the non-secured release print job 186 so that a user may remove it from the output bin 116 of the imaging device 102.

One exemplary method for creating the scenario shown in FIG. 10 would be to have the imaging device 102 prevent acceptance of data packets 184*a-c* for the secured release print job 184 on a logical channel/port, while simultaneously receiving/accepting data 186 on other logical channels/ports. For example, if the imaging device 102 is shared, the input process could begin, or continue to, accept a print job from a different client host device 100 on the same or different channel/port. For example, both client host devices 100 could be de-spooling to an LPR port. The imager input process manages simultaneous input on the same channel/port from different client host devices 100 by creating a pool of input threads and assigning a separate thread processing thread to the same channel/port for each distinct network connection (i.e. connections from a different network address).

FIG. 11 shows a one-host system embodiment of the present invention in which the imaging device 102 that, while preventing acceptance (shown as "blocked") of a secured release print job 184 (shown as 184*a-d*), may receive non-secured print jobs 186 (shown as 186*a-d*) from the same host device 100. This figure can be interpreted as showing the host device 100 sending initial data packet(s) 184*a* of a secured release print job 184 to the imaging device 102. The remaining blocked/suspended data packet(s) 184*b-d* remains on the host device 100. Before, during, or after the host device 100 sends the initial data packet(s) 184*a*, the host device 100 sends a non-secured release print job 186 (shown in progress with data packets 186*a-b* transmitted to the imaging device 102 and data packets 186*c-d* to be transmitted). Without waiting for the secured release print job 184 to be imaged, the imaging device 102 can image the non-secured release print job 186 so that a user may remove it from the output bin 116 of the imaging device 102.

One exemplary method for creating the scenario shown in FIG. 11 would be the imaging device 102 beginning to (or continuing to) accept another print job from the same client host device 100 on a different channel/port 187*b* other than the original channel/port 187*a*. For example, in MS WINDOWS®, the print spooler 104 creates a separate de-spooling thread per installed imaging device driver 160. Thus, a client host device 100 could create two logical installed imaging device drivers 160 on the client host device 100 to the same physical imaging device 102, where the two logical installed imaging device drivers 160 differ in the type of channel/port connection (e.g. LPR and 9100). In this example, the spooler 104 would create separate threads, and while one secured release print job 184 is prevented from being accepted on one thread, the spooler 104 could continue to de-spool a second print job 186 (which may or may not be a secured release print job) to the same imaging device 102. The imaging device 102 input process manages simultaneous input from different channels/ports 187a, 187b by assigning a separate processing thread(s) to each channel/port 187a, 187b.

FIG. 12 shows an embodiment of the present invention in which multiple logical input channels/ports connect to multiple imaging devices 102 (Imager A and Imager B) so that a host 100 may continue to print after acceptance is prevented (shown as "blocked") of a secured release print job 184 (shown as 184a-d). In this case, the print spooler 104 creates a separate thread(s) for the other installed imaging device driver(s) 160 and initiates the de-spooling of other print jobs simultaneously with the de-spooling secured release print job that has been prevented from being accepted.

As shown in FIG. 12, a client host device 100 may continue to de-spool print jobs (secured release and non-secured release) to other imaging devices 102 (e.g. Imager B) while a client host device 100 has the de-spooling of a secured release print job 184 (shown as 184a-d) prevented from being accepted by a first imaging device 102 (Imager A). Specifically, this figure shows a one-host/two imager system exemplary alternative preferred embodiment of the present invention in which the first imaging device 102 (Imager A) prevents acceptance of a secured release print job 184 (shown as 184a-d) while the second imaging device 102 (Imager B) receives a non-secured print jobs 186 (shown as 186a-d) from the same host device 100. This figure can be interpreted as showing the host device 100 sending initial data packet(s) 184a of a secured release print job 184 to the imaging device 102 (Imager A). The remaining blocked/suspended data packet(s) 184b-d remains on the host device 100. Before, during, or after the host device 100 sends the initial data packet(s) 184a, the host device 100 sends a non-secured release print job 186 (shown in progress with data packets 186a-b transmitted to the imaging device 102 (Imager B) and data packets 186c-d to be transmitted). Without waiting for the secured release print job 184 to be imaged on the first imaging device 102 (Imager A), the second imaging device 102 (Imager B) can image the non-secured release print job 186 so that a user may remove it from the output bin 116 of the imaging device 102 (Imager B).

Figure 13:
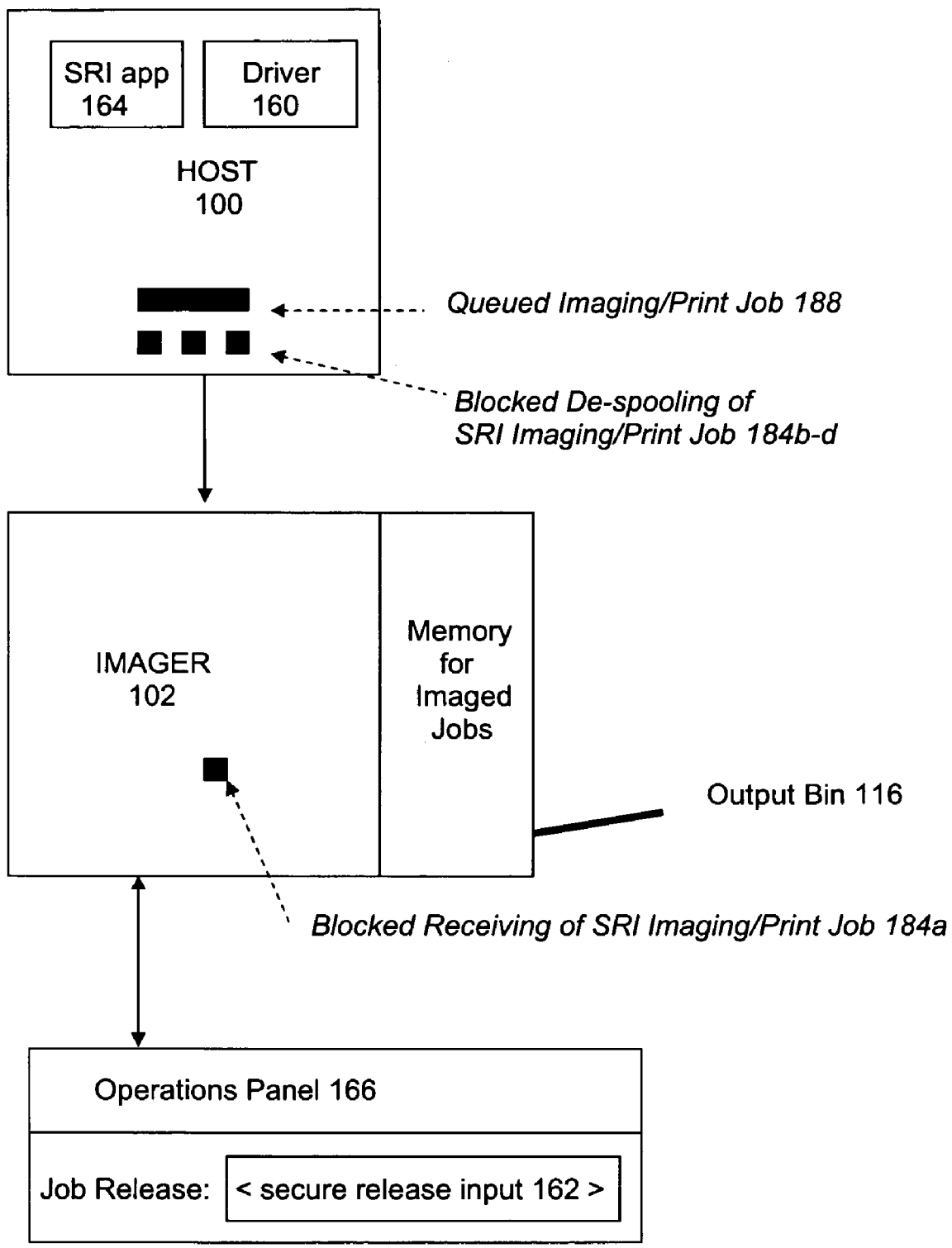
FIG. 13 is a schematic diagram of a single input channel/port of a host device connected to a single imaging device.

FIG. 13 shows an embodiment of the present invention in which a single input channel/port of a host device 100 connects to a single imaging device 102 with a single logical channel/port. In this embodiment, if the user attempts to de-spool a second imaging/print job 188 to the same logical channel/port on the imaging device 102 while a secured release print job 184 is prevented from being accepted (shown as "blocked") on the logical channel/port from the same host device 100, the second imaging/print job 188 would remain queued on the client host device's local imaging queue (e.g. print queue), until the first secured release print job 184 is accepted and fully de-spooled.

It should be noted, however, that the problem depicted in FIG. 13 could be solved by using multiple logical channels/ports as discussed in connection with FIG. 11. For example, the client host device 100 could create two logical installed imaging device drivers 160 on the client host device 100 to the same physical imaging device 102, where the two logical installed imaging device drivers 160 differ in the type of channel/port connection (e.g. LPR and 9100). In more advanced host device 100 print subsystems, an imaging device 102 and a host device 100 spooler 104/de-spooler 106 may support simultaneous de-spooling of multiple print jobs from the same client host device 100 to the same channel/port. Such a method is disclosed in U.S. patent application Ser. No. 10/925,602, which is incorporated herein by reference.

Figure 14:
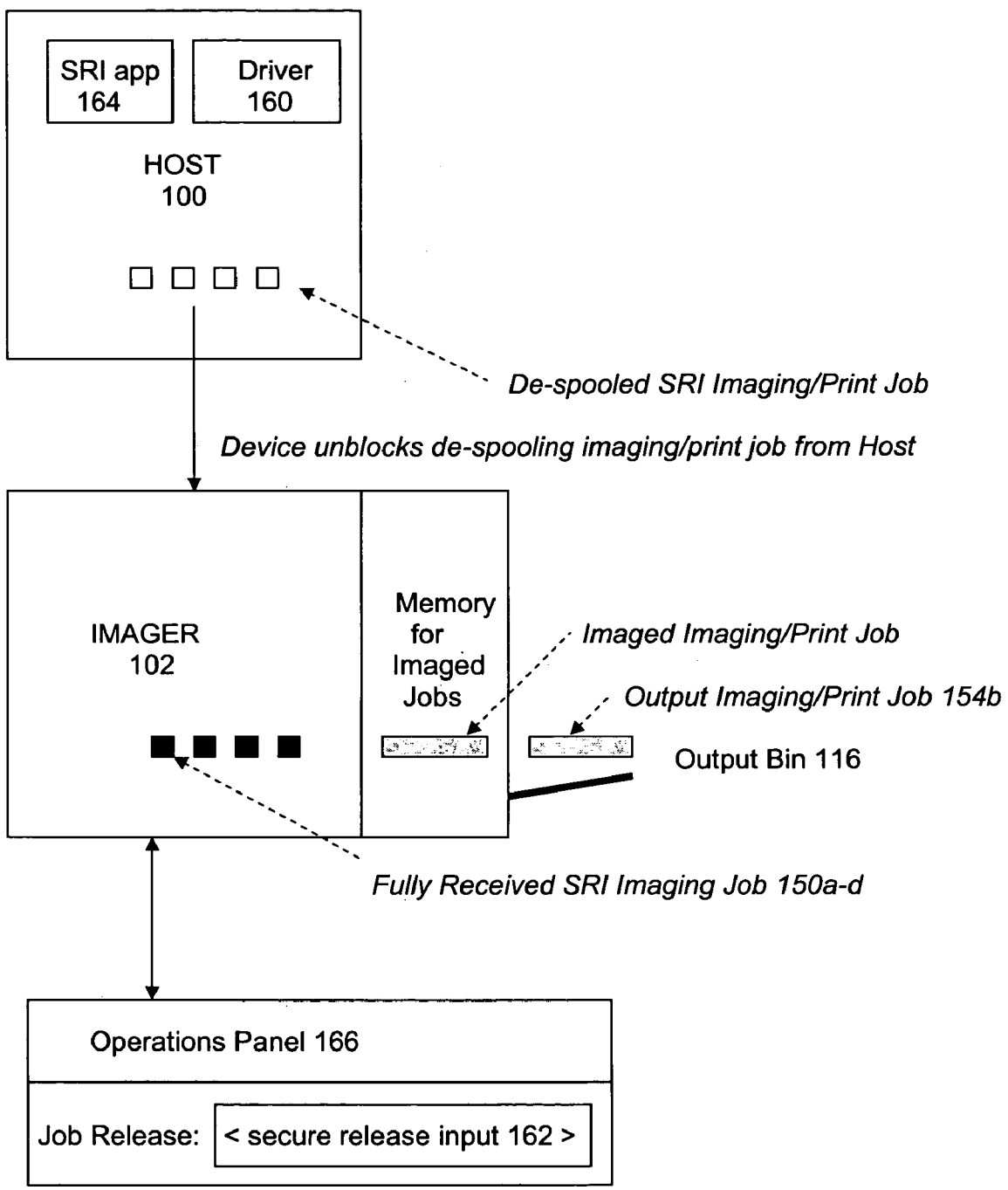
FIG. 14 is a schematic diagram showing one preferred method for the secured release of the secured release print job.

FIG. 14 shows an exemplary preferred embodiment of a secured release method for releasing the secured release print job that has been prevented from being accepted (shown as "blocked") at the imaging device 102. To retrieve the secured release print job, the user would, for example, enter the secured release input 162 on the operations panel 166 of the imaging device 102. Alternatively, the user could enter the secured release input 162 on alternative secured release input apparatus 166 and/or remotely through an embedded Web page. When the secured release print job is securely released, the imaging device 102 resumes acceptance of data packets (e.g. 150b, 150c, 150d) on the logical channel/port as the port monitor on the host device 100 is "unblocked" or "unsuspended." This can be distinguished from known pull systems in which a request is sent to a host or server to transmit the print job. In the present invention, the print job is in a suspension mode on a logical channel/port and is just waiting for the logical channel/port to be "unblocked" or "unsuspended." The input analyzer 170 may "resume acceptance" of the data packets by allowing the remainder of the data packets (e.g. 150b, 150c, 150d) to be transmitted to the imaging device 102. (The initial data packet 150a preferably has been maintained in the imaging device.) The processing of the print job may then proceed as normal. For example, the imaging device 102 images and outputs the print job. The user may then remove the output imaging/print job 154b from the output bin 116 of the imaging device 102.

Figure 15:
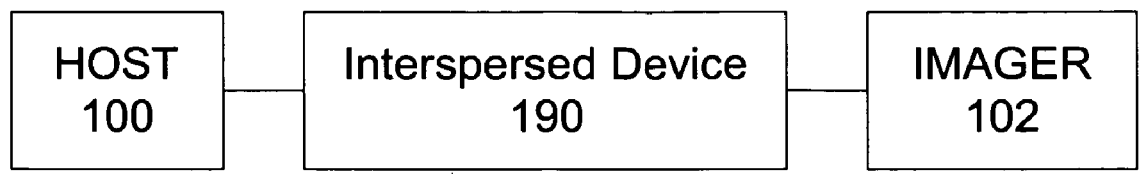
FIG. 15 is a simplified block diagram showing a specialized interspersed device functionally between the client host device and the imaging device, the specialized interspersed device providing at least some of the functions of the client host device.

FIG. 15 shows an embodiment in which a specialized interspersed device 190 (e.g. print server) may be functionally between the client host device 100 and the imaging device 102, the client host device 100 and the specialized interspersed device 190 together functioning as the client host device side. Using this system, the host device 100 transmits the secured release print job to the specialized interspersed device 190 which, in turn, transmits the secured release print job to the imaging device 102. After the client host device 100 initially de-spools the print job to the interspersed device 190, the specialized interspersed device 190 functions, at least partially, as the client host device 100. For example, the specialized interspersed device 190 may functionality de-spool the print job to the imaging device 102, may provide additional logical channel(s)/port(s), and/or release the print job to the imaging device 102. In this embodiment the imaging/print job is retained on the specialized interspersed device 190 (which is functioning as the client host device side) until it is securely released to the imaging device 102. It should be noted that the embodiments of FIGS. 8-14 and 18 could be implemented using the specialized interspersed device 190.

Figure 16:
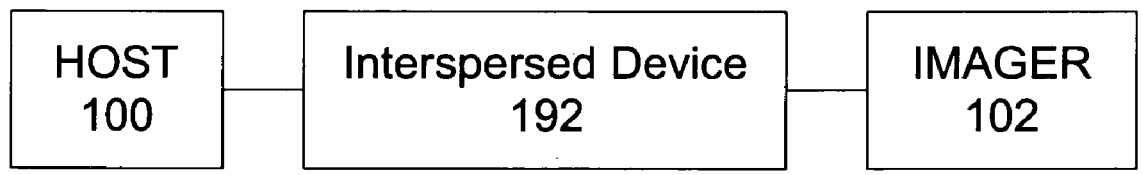
FIG. 16 is a simplified block diagram showing a specialized interspersed device functionally between the client host device and the imaging device, the specialized interspersed device providing at least some of the functions of the imaging device.

FIG. 16 shows an embodiment in which a specialized interspersed device 192 (e.g. print server) may be functionally between the client host device 100 and the imaging device 102, the imaging device 102 and the specialized interspersed device 192 together functioning as the client host device side. In this embodiment the specialized interspersed device 192 at least partially provides functions of the imaging device side. For example, the specialized interspersed device 192 may prevent acceptance (including the functionality of the input analyzer 170), may provide storage/memory (e.g. for initial sub-portions of the headed imaging/print job 150a), may provide additional logical channel(s)/port(s), and/or may function as the operations panel 166. This embodiment could be implemented as a specialized box that is positioned on or near a standard imaging device 102. Using this system, the host device 100 transmits the secured release print job to the specialized interspersed device 192 which, in turn, transmits the secured release print job to the imaging device 102 when the secure release input 162 is input. It should be noted that the embodiments of FIGS. 8-14 and 18 could be implemented using the specialized interspersed device 192.

Figure 17:
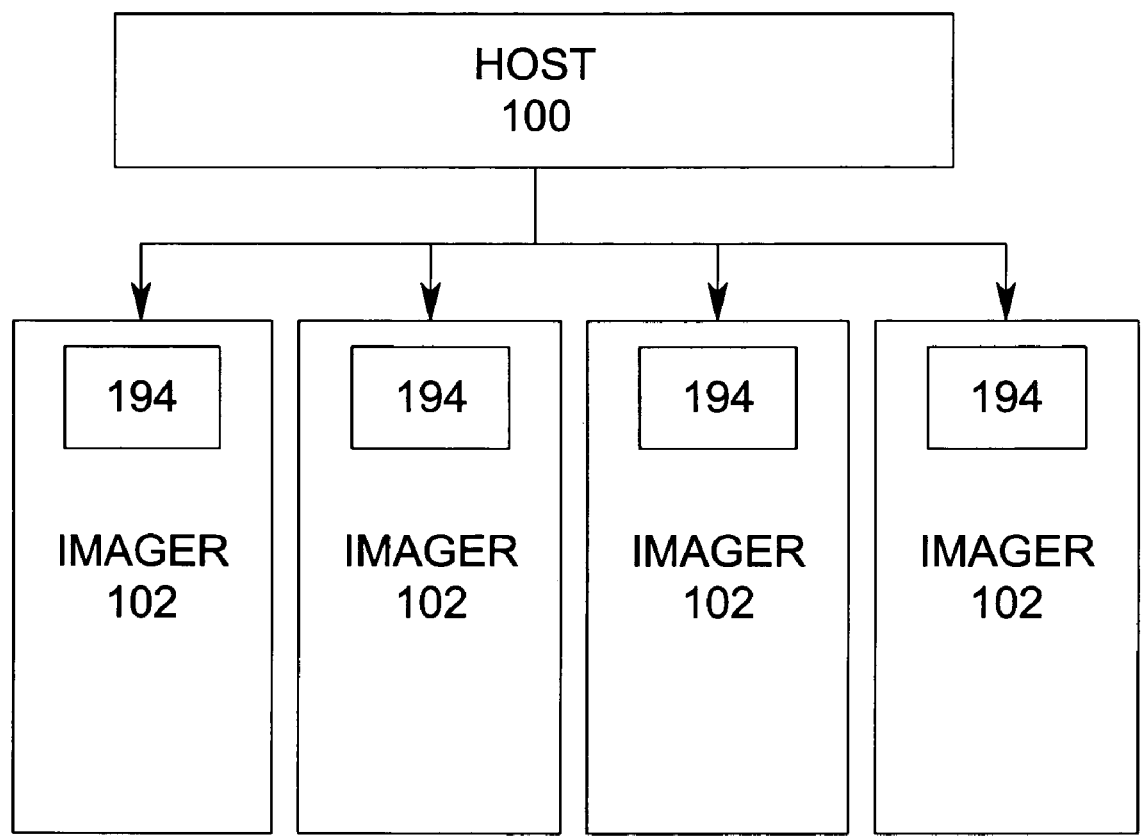
FIG. 17 is a simplified block diagram showing the client host device de-spooling the initial sub-portion of the print job to a plurality of imaging devices 102 to implement a "follow me" or "print anywhere" form of printing.

FIG. 17 shows an embodiment of the present invention in which the client host device 100 de-spools the initial sub-portion 194 (data packet(s) with print job header 152) of the print job to a plurality of imaging devices 102. This allows the system to be implemented as a "follow me" or "print anywhere" form of printing. After the initial sub-portion 194 of the print job is de-spooled to a plurality of imaging devices 102, the user may then securely release the print job from any one of the plurality of imaging devices 102. Once securely released, the remaining imaging devices 102 are notified and purge their copy of the initial sub-portion 194 of the print job.

It should be noted that the present invention may include an input/output (I/O) timeout configured to wait for a secured release. The timeout can be configured to allow sufficient time for the user to securely release the imaging/print job. If the user fails to enter the secure release code before the expiration of the timeout, the device or host would then terminate the connection and purge the imaging/print job. The timeout can be also be configured to purge the imaging/print job after the timeout is exceeded (which could result in a lost imaging/print job). The host device 100, upon detection of the terminated connection, could purge its portion of the imaging/print job. In this manner, the system can be configured to prevent lost or forgotten imaging/print job from wasting valuable system resources. The input/output (I/O) timeout may be implemented on the client host device 100 and/or the imaging device 102.

Miscellaneous

For purposes of this invention, a "print job" or "imaging job" includes traditional print jobs as well as faxing, copying, scanning, document manipulation, and other nontraditional print jobs. Other embodiments could include document management, such as document archive/retrieval, manipulation, and transfer. The print job may also have other security related attributes, such as authorization control and encryption.

For purposes of this invention, the secured release input 162 may be any type of identifying information including, but not limited to an ID code, an alphanumeric code, a personal identification number (PIN), a magnetic identification card, a smart card, or biometric information (e.g. a retinal scan or a fingerprint) from a biometric sensor. The secured release input print release mechanism is not limited to secured release, but also includes interactive release without a secured release input 162.

The secured release input 162 may be entered at the host device 100 and/or the imaging device using standard input devices such as a keyboard, a mouse, a microphone, or an operations panel. In an alternative preferred embodiment the secured release input 162 may be entered via specialized hardware. For example, in addition to or as an alternative to using standard input devices, the secured release input 162 may be implemented using specialized secured release input apparatus 164 such as a specialized keypad, magnetic identification card reader, or a biometric sensor (e.g. fingerprint or retinal scanner).

It should be noted that additional security measures such as encryption and/or overwriting may be used for particularly sensitive print jobs.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. A method of securely imaging an imaging/print job in a distributed computer system having at least one client host device having an associated secured release input apparatus, at least one imaging device having an associated secured release input apparatus, and a network for interconnecting components of said distributed computer system, said method comprising the steps of:

(a) associating a print job header with a first imaging/print job to form a headed imaging/print job;

(b) associating a secured release input with said print job header by including a secured release indicative command/code in said print job header;

(c) dividing said headed imaging/print job into data packets;

(d) transmitting at least one initial data packet from a client host device to said at least one imaging device;

(e) determining whether said secured release indicative command/code is present in said at least one initial data packet;

and (f) preventing acceptance at said imaging device of subsequent data packets of said headed imaging/print job if said secured release indicative command/code is present in said at least one initial data packet.

2. The method of claim 1 further comprising the steps of:

(a) receiving said secured release input on said secured release input apparatus of said imaging device to securely release said imaging/print job; and (b) accepting subsequent data packets of said headed imaging/print job.

3. The method of claim 1 wherein the step of preventing acceptance at said imaging device of subsequent data packets results in said subsequent data packets remaining on said client host device.

4. The method of claim 1 wherein the step of preventing acceptance at said imaging device of subsequent data packets further comprises the step of blocking subsequent data packets on a corresponding logical channel/port.

5. The method of claim 1 wherein the step of preventing acceptance at said imaging device of subsequent data packets further comprises the step of suspending receipt of subsequent data packets on a corresponding logical channel/port.

6. The method of claim 1 further comprising the step of receiving and analyzing at least one initial data packet of a second imaging/print job on a second logical channel/port while preventing acceptance of said first imaging/print job on a first logical channel/port.

7. The method of claim 1 wherein said step of determining whether said secured release indicative command/code is present in said at least one initial data packet further comprising the steps of:

(a) receiving a first initial data packet of said headed imaging/print job at an input analyzer;

(b) determining whether a complete print job header has been received;

(c) receiving a next initial data packet of said headed imaging/print job at said input analyzer if said complete print job header has not been received as determined in step (b) and repeating steps (b) and (c) until said complete print job header has been received; and (d) determining whether a secured release indicative command/code has been detected in said print job header.

8. The method of claim 7 further comprising the step of pre-reading said first and next initial data packet(s) to determine whether a secured release indicative command/code has been detected in said print job header, said step of pre-reading occurring prior to said step of determining whether a complete print job header has been received.

9. The method of claim 1 wherein said client host device includes a specialized interspersed device, said specialized interspersed device providing at least some of the functionality of said client host device, said specialized interspersed device functionally between said client host device and said imaging device.

10. The method of claim 1 wherein said imaging device includes a specialized interspersed device, said specialized interspersed device providing at least some of the functionality of said imaging device, said specialized interspersed device functionally between said client host device and said imaging device.

11. A system for secured release to transmit and image an imaging/print job, having a network of connected devices including at least one client host device side and at least one imaging device side, said system comprising:
  (a) an imaging device driver associated with said at least one client host device side having an associated secured release input apparatus;
  (b) an input analyzer associated with at least one imaging device side having an associated secured release input apparatus;
  (c) at least one logical channel/port functionally connecting said imaging device driver and said input analyzer;
  (d) said imaging device driver comprising:
    (i) means for associating a print job header with a first imaging/print job to form a headed imaging/print job;
    (ii) means for associating a secured release input with said print job header by including a secured release indicative command/code in said print job header;
    (iii) means dividing said headed imaging/print job into data packets; and
    (iv) means for transmitting at least one initial data packet from a client host device to said at least one imaging device side over said at least one logical channel/port; and
  (e) said input analyzer comprising:
    (i) means for receiving at least one initial data packet;
    (ii) means determining whether said, secured release indicative command/code is present in said at least one initial data packet; and
    (iii) means for preventing acceptance at said imaging device of subsequent data packets of said headed imaging/print job over said at least one logical channel/port if said secured release indicative command/code is present in said at least one initial data packet.

12. The system of claim 11, said input analyzer comprising means for securely releasing said imaging/print job by accepting subsequent data packets of said headed imaging/print job over said at least one logical channel/port when a secured release input is received on said secured release input apparatus of said imaging device side.

13. The system of claim 11 wherein said means for preventing acceptance at said imaging device further comprises means for blocking subsequent data packets on a corresponding logical channel/port.

14. The system of claim 11 wherein said means for preventing acceptance at said imaging device further comprises means for suspending receipt of subsequent data packets on a corresponding logical channel/port.

15. The system of claim 11 further comprising means for receiving and analyzing at least one initial data packet of a second imaging/print job on a second logical channel/port while preventing acceptance of said first imaging/print job on a first logical channel/port.

16. The system of claim 11 wherein said client host device side includes a specialized interspersed device, said specialized interspersed device providing at least some of the functionality of said client host device side.

17. The system of claim 11 wherein said imaging device side includes a specialized interspersed device, said specialized interspersed device providing at least some of the functionality of said imaging device side.

18. A method of securely imaging an imaging/print job in a distributed computer system having at least one client host device side having an associated secured release input apparatus, at least one imaging device side having an associated secured release input apparatus, and a network for interconnecting components of said distributed computer system, said method comprising the steps of:
  (a) at said at least one client host device side, generating a headed imaging/print job including a print job header and an imaging/print job, said print job header including a secured release indicative command/code;
  (b) transmitting at least part of said print job header of said headed imaging/print job over a logical channel/port from said at least one client host device side to said at least one imaging device side, a remainder of said headed imaging/print job remaining on said client host device side;
  (c) at said at least one imaging device side, determining whether said secured release indicative command/code is present in said at least one initial data packet;
  (d) preventing acceptance at said at least one imaging device side of said remainder of said headed imaging/print job if said secured release indicative command/code is present in said transmitted at least part of said print job header; and
  (e) allowing acceptance at said at least one imaging device side of said remainder of said headed imaging/print job upon receiving a secured release input on said secured release input apparatus of said imaging device side.

19. The method of claim 18, the step of preventing acceptance further comprises the step of blocking said remainder of said headed imaging/print job on said logical channel/port, the step of allowing acceptance further comprises the step of unblocking said logical channel/port to allow transmission of said headed imaging/print job to said imaging device side.

20. The method of claim 18, the step of preventing acceptance further comprises the step of suspending receipt of said remainder of said headed imaging/print job on said logical channel/port, the step of allowing acceptance further comprises the step of un-suspending receipt of said logical channel/port to allow transmission of said headed imaging/print job to said imaging device side.

21. The method of claim 18 wherein said distributed computer system includes a first client host device side, a second client host device side, and a single imaging device side, said method further comprising the steps of:

(a) at said first client host device side, generating a first secure headed imaging/print job including a print job header and an imaging/print job, said print job header including a secured release indicative command/code;

(b) at said second client host device side, generating a second non-secure headed imaging/print job including a print job header and an imaging/print job, a secured release indicative command/code absent from said print job header;

(c) transmitting at least part of said print job header of said first headed imaging/print job over a first logical channel/port from said first client host device side to said at least one imaging device side, a remainder of said first headed imaging/print job remaining on said first client host device side;

(d) at said at least one imaging device side, determining said secured release indicative command/code is present in said at least part of said print job header of said first headed imaging/print job and preventing acceptance of said remainder of said first headed imaging/print job;

(e) transmitting at least part of said print job header of said second headed imaging/print job over a second logical channel/port from said second client host device side to said at least one imaging device side, a remainder of said second headed imaging/print job remaining on said second client host device side; and (f) at said at least one imaging device side, determining said secured release indicative command/code is absent from said at least part of said print job header of said second headed imaging/print job and allowing acceptance of said remainder of said second headed imaging/print job over said second logical channel/port.

22. The method of claim 18 wherein said distributed computer system includes a single client host device side and a single imaging device side, said method further comprising the steps of:

(a) at said client host device side, generating a first secure headed imaging/print job including a print job header and an imaging/print job, said print job header including a secured release indicative command/code;

(b) at said client host device side, generating a second non-secure headed imaging/print job including a print job header and an imaging/print job, a secured release indicative command/code absent from said print job header;

(c) transmitting at least part of said print job header of said first headed imaging/print job over a first logical channel/port from said client host device side to said imaging device side, a remainder of said first headed imaging/ print job remaining on said client host device side;

(d) at said at least one imaging device side, determining said secured release indicative command/code is present in said at least part of said print job header of said first headed imaging/print job and preventing acceptance of said remainder of said first headed imaging/print job;

(e) transmitting at least part of said print job header of said second headed imaging/print job over a second logical channel/port from said client host device side to said imaging device side, a remainder of said second headed imaging/print job remaining on said second client host device side; and (f) at said imaging device side, determining said secured release indicative command/code is absent from said at least part of said print job header of said second headed imaging/print job and allowing acceptance of said remainder of said second headed imaging/print job over said second logical channel/port.

23. The method of claim 18 wherein said distributed computer system includes a single client host device side, a first imaging device side, and a second imaging device side, said method further comprising the steps of:

(a) at said client host device side, generating a first secure headed imaging/print job including a print job header and an imaging/print job, said print job header including a secured release indicative command/code;

(b) at said client host device side, generating a second non-secure headed imaging/print job including a print job header and an imaging/print job, a secured release indicative command/code absent from said print job header;

(c) transmitting at least part of said print job header of said first headed imaging/print job over a first logical channel/port from said client host device side to said first imaging device side, a remainder of said first headed imaging/print job remaining on said client host device side;

(d) at said first imaging device side, determining said secured release indicative command/code is present in said at least part of said print job header of said first headed imaging/print job and preventing acceptance of said remainder of said first headed imaging/print job;

(e) transmitting at least part of said print job header of said second headed imaging/print job over a second logical channel/port from said client host device side to said second imaging device side, a remainder of said second headed imaging/print job remaining on said client host device side; and (f) at said second imaging device side, determining said secured release indicative command/code is absent from said at least part of said print job header of said second headed imaging/print job and allowing acceptance of said remainder of said second headed imaging/print job over said second logical channel/port.

* * * * *